(12) United States Patent
Dhiman et al.

(10) Patent No.: US 9,381,528 B2
(45) Date of Patent: *Jul. 5, 2016

(54) ARTICLES FOR MANIPULATING IMPINGING LIQUIDS AND METHODS OF MANUFACTURING SAME

(71) Applicant: Massachusetts Institute of Technology, Cambridge, MA (US)

(72) Inventors: Rajeev Dhiman, Glastonbury, CT (US); James C. Bird, Cambridge, MA (US); Hyukmin Kwon, Cambridge, MA (US); Kripa K. Varanasi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,112

(22) Filed: Jun. 11, 2014

(65) Prior Publication Data
US 2014/0291420 A1  Oct. 2, 2014

Related U.S. Application Data

(62) Division of application No. 13/300,022, filed on Nov. 18, 2011.

(60) Provisional application No. 61/514,794, filed on Aug. 3, 2011.

(51) Int. Cl.
*B05B 1/26* (2006.01)
*B08B 17/06* (2006.01)
(Continued)

(52) U.S. Cl.
CPC . *B05B 1/26* (2013.01); *B05D 1/185* (2013.01); *B05D 5/083* (2013.01); *B08B 17/065* (2013.01);
(Continued)

(58) Field of Classification Search
CPC .......... B05B 1/26; B82Y 40/00; B82Y 30/00; B05D 1/185; B05D 5/083; B05D 5/02; B08B 17/065; Y10T 428/24355
USPC ......................................................... 428/141
See application file for complete search history.

(56) References Cited

U.S. PATENT DOCUMENTS 4,069,933 A   1/1978 Newing
4,125,152 A   11/1978 Kestner et al.
(Continued)

FOREIGN PATENT DOCUMENTS

CN   100344341 C   10/2007
CN   101269960 B   5/2011
(Continued)

OTHER PUBLICATIONS

Azimi, G. et al., Hydrophobicity of rare-earth oxide ceramics, Nature Materials, DOI:10.1038/NMAT3545, (2013).
(Continued)

*Primary Examiner* — Laura Auer
(74) *Attorney, Agent, or Firm* — Choate, Hall & Stewart LLP

(57) ABSTRACT

This invention relates generally to an article that includes a non-wetting surface having a dynamic contact angle of at least about 90°. The surface is patterned with macro-scale features configured to induce controlled asymmetry in a liquid film produced by impingement of a droplet onto the surface, thereby reducing time of contact between the droplet and the surface.

15 Claims, 16 Drawing Sheets

(51) Int. Cl.
*B82Y 30/00* (2011.01)
*B05D 5/08* (2006.01)
*B05D 1/18* (2006.01)
*B82Y 40/00* (2011.01)
*B05D 5/02* (2006.01)

(52) U.S. Cl.
CPC .............. *B82Y 30/00* (2013.01); *B82Y 40/00* (2013.01); *B05D 5/02* (2013.01); *Y10T 428/24355* (2015.01)

(56) References Cited

U.S. PATENT DOCUMENTS

| | | |
|---|---|---|
| 4,204,021 A | 5/1980 | Becker |
| 4,316,745 A | 2/1982 | Blount |
| 4,503,099 A | 3/1985 | Chang et al. |
| 5,133,516 A | 7/1992 | Marentic et al. |
| 5,154,741 A | 10/1992 | da Costa Filho |
| 5,624,713 A | 4/1997 | Ramer |
| 5,816,280 A | 10/1998 | Rojey et al. |
| 5,817,898 A | 10/1998 | Delion et al. |
| 5,853,802 A | 12/1998 | Boyer et al. |
| 5,900,516 A | 5/1999 | Talley et al. |
| 5,936,040 A | 8/1999 | Costello et al. |
| 6,028,234 A | 2/2000 | Heinemann et al. |
| 6,093,862 A | 7/2000 | Sinquin et al. |
| 6,216,472 B1 | 4/2001 | Cathenaut et al. |
| 6,329,490 B1 | 12/2001 | Yamashita et al. |
| 6,389,820 B1 | 5/2002 | Rogers et al. |
| 7,323,221 B2 | 1/2008 | Heppekausen et al. |
| 7,458,384 B1 | 12/2008 | Seal et al. |
| 7,597,148 B2 | 10/2009 | O'Malley et al. |
| 7,622,197 B2 | 11/2009 | Balow et al. |
| 7,687,593 B2 | 3/2010 | Yamahiro et al. |
| 7,722,951 B2 | 5/2010 | Li et al. |
| 7,887,934 B2 | 2/2011 | Gentleman et al. |
| 7,892,660 B2 | 2/2011 | Gentleman et al. |
| 7,897,271 B2 | 3/2011 | Gentleman et al. |
| 7,901,798 B2 | 3/2011 | Gentleman et al. |
| 7,977,267 B2 | 7/2011 | Gentleman et al. |
| 7,985,451 B2 | 7/2011 | Luzinov et al. |
| 8,057,922 B2 | 11/2011 | Gentleman et al. |
| 8,057,923 B2 | 11/2011 | Gentleman et al. |
| 8,062,775 B2 | 11/2011 | Gentleman et al. |
| 8,173,279 B2 | 5/2012 | Gentleman et al. |
| 8,178,219 B2 | 5/2012 | Gentleman et al. |
| 8,222,172 B2 | 7/2012 | Gentleman et al. |
| 8,235,096 B1 | 8/2012 | Mahefkey et al. |
| 8,236,432 B2 | 8/2012 | Gentleman et al. |
| 8,252,259 B2 | 8/2012 | Seal et al. |
| 8,377,390 B1 | 2/2013 | Brueck et al. |
| 8,574,704 B2 | 11/2013 | Smith et al. |
| 8,859,090 B2 | 10/2014 | Angelescu et al. |
| 2002/0164443 A1 | 11/2002 | Oles et al. |
| 2003/0096083 A1 | 5/2003 | Morgan et al. |
| 2003/0134035 A1 | 7/2003 | Lamb et al. |
| 2003/0203117 A1 | 10/2003 | Bartkowiak et al. |
| 2003/0226806 A1 | 12/2003 | Young et al. |
| 2004/0026832 A1 | 2/2004 | Gier et al. |
| 2004/0037961 A1 | 2/2004 | Dieleman et al. |
| 2004/0219373 A1 | 11/2004 | Deruelle et al. |
| 2005/0003146 A1* | 1/2005 | Spath ........................ 428/105 |
| 2005/0009953 A1 | 1/2005 | Shea |
| 2005/0016489 A1 | 1/2005 | Endicott et al. |
| 2005/0061221 A1 | 3/2005 | Paszkowski |
| 2005/0112326 A1 | 5/2005 | Nun et al. |
| 2005/0136217 A1 | 6/2005 | Barthlott et al. |
| 2005/0208272 A1 | 9/2005 | Groll |
| 2006/0013735 A1 | 1/2006 | Engelking et al. |
| 2006/0078724 A1 | 4/2006 | Bhushan et al. |
| 2006/0147675 A1 | 7/2006 | Nun et al. |
| 2006/0204738 A1 | 9/2006 | Dubrow et al. |
| 2006/0240218 A1 | 10/2006 | Parce |
| 2006/0246226 A1 | 11/2006 | Dai et al. |
| 2007/0026193 A1* | 2/2007 | Luzinov et al. ............ 428/141 |
| 2007/0031639 A1 | 2/2007 | Hsu et al. |
| 2007/0135602 A1 | 6/2007 | Yamahiro et al. |
| 2007/0207335 A1 | 9/2007 | Karandikar et al. |
| 2007/0231542 A1 | 10/2007 | Deng et al. |
| 2007/0282247 A1 | 12/2007 | Desai et al. |
| 2007/0298216 A1 | 12/2007 | Jing et al. |
| 2008/0085070 A1 | 4/2008 | Hirata et al. |
| 2008/0118763 A1 | 5/2008 | Balow et al. |
| 2008/0213461 A1 | 9/2008 | Gill et al. |
| 2008/0225378 A1 | 9/2008 | Weikert et al. |
| 2009/0124520 A1 | 5/2009 | Tohidi |
| 2009/0155609 A1 | 6/2009 | Gentleman et al. |
| 2009/0185867 A1 | 7/2009 | Masters et al. |
| 2009/0211735 A1 | 8/2009 | Stenkamp et al. |
| 2009/0231273 A1 | 9/2009 | Lashina et al. |
| 2010/0028604 A1 | 2/2010 | Bhushan et al. |
| 2010/0092621 A1 | 4/2010 | Akutsu et al. |
| 2010/0098909 A1 | 4/2010 | Reyssat et al. |
| 2010/0112286 A1 | 5/2010 | Bahadur et al. |
| 2010/0147441 A1 | 6/2010 | Nakagawa et al. |
| 2010/0180952 A1 | 7/2010 | Verhelst et al. |
| 2010/0200094 A1 | 8/2010 | Ermakov |
| 2010/0218517 A1 | 9/2010 | Luther |
| 2010/0285229 A1 | 11/2010 | Elbahri et al. |
| 2010/0285275 A1 | 11/2010 | Baca et al. |
| 2010/0307922 A1 | 12/2010 | Wu |
| 2010/0330146 A1 | 12/2010 | Chauhan et al. |
| 2010/0330340 A1 | 12/2010 | Rothstein et al. |
| 2011/0042850 A1 | 2/2011 | Hong et al. |
| 2011/0077172 A1 | 3/2011 | Aizenberg et al. |
| 2011/0106504 A1 | 5/2011 | Noureldin |
| 2011/0201984 A1 | 8/2011 | Dubrow et al. |
| 2011/0226998 A1 | 9/2011 | Van De Weijer-Wagemans et al. |
| 2011/0283778 A1 | 11/2011 | Angelescu et al. |
| 2011/0287217 A1 | 11/2011 | Mazumder et al. |
| 2012/0036846 A1 | 2/2012 | Aizenberg et al. |
| 2012/0128963 A1 | 5/2012 | Mao et al. |
| 2013/0003258 A1 | 1/2013 | Xie et al. |
| 2013/0032316 A1 | 2/2013 | Dhiman et al. |
| 2013/0034695 A1 | 2/2013 | Smith et al. |
| 2013/0062285 A1 | 3/2013 | Hoek et al. |
| 2013/0146536 A1 | 6/2013 | Tarabara et al. |
| 2013/0220813 A1 | 8/2013 | Anand et al. |
| 2013/0227972 A1 | 9/2013 | Hatton et al. |
| 2013/0251769 A1 | 9/2013 | Smith et al. |
| 2013/0251942 A1 | 9/2013 | Azimi et al. |
| 2013/0251946 A1 | 9/2013 | Azimi et al. |
| 2013/0251952 A1 | 9/2013 | Smith et al. |
| 2013/0333789 A1 | 12/2013 | Smith et al. |
| 2013/0335697 A1 | 12/2013 | Smith et al. |
| 2013/0337027 A1 | 12/2013 | Smith et al. |
| 2014/0147627 A1 | 5/2014 | Aizenberg et al. |
| 2014/0291420 A1 | 10/2014 | Dhiman et al. |
| 2015/0111063 A1 | 4/2015 | Khan et al. |
| 2015/0125575 A1 | 5/2015 | Smith et al. |

FOREIGN PATENT DOCUMENTS

| | | |
|---|---|---|
| DE | 198 18 956 A1 | 11/1998 |
| EP | 0230112 A2 | 7/1987 |
| EP | 1892458 A1 | 2/2008 |
| JP | 1 170932 A | 7/1989 |
| JP | 5 240251 A | 9/1993 |
| JP | 2004 037764 A | 2/2004 |
| JP | 2008240910 A | 10/2008 |
| TW | I 233 968 B | 6/2005 |
| WO | WO-93/17077 A1 | 9/1993 |
| WO | WO-99/36490 A1 | 7/1999 |
| WO | WO-02/062568 A2 | 8/2002 |
| WO | WO-03/071275 A1 | 8/2003 |
| WO | WO-2006/017009 A2 | 2/2006 |
| WO | WO-2006/091235 A1 | 8/2006 |
| WO | WO-2006/132892 A2 | 12/2006 |
| WO | WO-2007/019362 A1 | 2/2007 |
| WO | WO-2008/111603 A1 | 9/2008 |
| WO | WO-2009/009185 A2 | 1/2009 |
| WO | WO-2010/028752 A1 | 3/2010 |
| WO | WO-2010/082710 A1 | 7/2010 |
| WO | WO-2010/096073 A1 | 8/2010 |

(56) References Cited

FOREIGN PATENT DOCUMENTS

| WO | WO-2010/129807 A1 | 11/2010 |
|---|---|---|
| WO | WO-2011/087458 A1 | 7/2011 |
| WO | WO-2011/143371 A1 | 11/2011 |
| WO | WO-2012/024099 A1 | 2/2012 |
| WO | WO-2012/100099 A2 | 7/2012 |
| WO | WO-2012/100100 A2 | 7/2012 |
| WO | WO-2013/022467 A2 | 2/2013 |
| WO | WO-2013/130118 A1 | 9/2013 |
| WO | WO-2013/141888 A1 | 9/2013 |
| WO | WO-2013/141953 A2 | 9/2013 |

OTHER PUBLICATIONS

Bird, J. C. et al, Reducing the contact time of a bouncing drop, Nature, 503:385 (2013).
Eck, S. et al., Growth and thermal properties of ultrathin cerium oxide layers on Rh(111), Surface Science, 520:173-185, (2002).
Fluorinert Liquids For Electronics Manufacturing, 2003, 3M Corporation, pp. 1-4.
International Search Report, PCT/US12/65627, Mar. 8, 2013, 3 pages.
Kazi et al., Mineral Scale Formation and Mitigation on Metals and a Polymeric Heat Exchanger Surface, Applied Thermal Engineering, 30:2236-2242 (2010).
Matolín, V. et al., Growth of ultra-thin cerium oxide layers on Cu(111), Surface Science 254:153-155, (2007).
Mullins, D. R. et al., Ordered cerium oxide thin films gown on Ru(0001) and Ni(111), Surface Science, 429:186-198, (1999).
Santos et al., Modified Stainless Steel Surfaces Targeted to Reduce Fouling, J. Food Engineering, 64:63-79 (2004).
Schierbaum, Klaus-Dieter, Ordered ultra-thin cerium oxide overlayers on Pt(111) single crystal surfaces studied by LEED and XPS, Surface Science, 399:29-38, (1998).
Sutara, F. et al., Epitaxial growth of continuous $CeO_2$(111) ultra-thin films on Cu(111), Thin Solid Films, 516:6120-6124 (2008).
Written Opinion, PCT/US12/65627, Mar. 8, 2013, 10 pages.
Allain et al., A New Method for Contact-Angle Measurements of Sessile Drops, Journal of Calloid and Interface Science, vol. 107, No. 1, Sep. 1985, 9 pages.
Anand et al., Enhanced Condensation on Lubricant-Impregnated Nanotextured Surfaces. ACS Nano, 6(11):10122-10129 (2012).
Antonini et al., Water Drops Dancing on Ice: How Sublimation Leads to Drop Rebound, PRL 111, 014501 (2013).
Arkles, Hydrophobicity, Hydrophilicity and Silanes, Paint and Coatings Industry, Oct. 1, 2006, 10 pages.
Ashkin et al., Optical levitation by radiation pressure. Applied Physics Letters, 19(8):283-285 (1971).
Ashkin et al., Optical levitation of liquid drops by radiation pressure. Science, 187(4181):1073-1075 (1975).
Avedisian et al., Leidenfrost boiling of methanol droplets on hot porous/ceramic surfaces. International Journal of Heat and Mass Transfer, 30(2):379-393 (1987).
Baier et al., Propulsion Mechanisms for Leidenfrost Solids on Ratchet Surfaces. arXiv preprint arXiv:1208.5721 (2012).
Baier et al., Propulsion mechanisms for Leidenfrost solids on ratchets. Physical Review E—Statistical, Nonlinear, and Soft Matter Physics, 87(2) (2013).
Barnes, Geoff T., The Potential for Monolayers to Reduce the Evaporation of Water From Large Water Storages, Agricultural Water Management 95, 4:339-353, (2008).
Bauer et al., The insect-trapping rim of Nepenthes pitchers: surface structure and function, Plant Signaling & Behavior, 4 (11): 1019-1023 (2009).
Beaugnon et al., Dynamics of magnetically levitated droplets. Physica B: Condensed Matter, 294-295:715-720 (2001).
Biance et al., Leidenfrost drops. Physics of Fluids, 15(6):1632-1637 (2003).
Bico et al., Pearl drops. Europhysics Letters, 47(2):220-226 (1999).
Blossey, R., Self-cleaning surfaces—Virtual realities. Nature Materials, 2(5):301-306 (2003).

Bohn et al., Insect aquaplaning: Nepenthes pitcher plants capture prey with the peristome, a fully wettable water-lubricated anisotropic surface, Proceedings of the National Academy of Sciences,14138-14143 (2004).
Burton, et al., Geometry of the Vapor Layer Under a Leidenfrost Drop. Physical Review Letters, 109(7):074301 (2012).
Cao et al., Anti-Icing Superhydrophobic Coatings, Langmuir Letter, 2009, A-E.
Cassie et al., Wettability of porous surfaces, Transactions of the Faraday Society, 40: 546-551, (1944).
Celestini, et al., Take Off of Small Leidenfrost Droplets. Physical Review Letters, 109(3):034501 (2012).
Chandra et al., Leidenfrost evaporation of liquid nitrogen droplets. Transactions—ASME: Journal of Heat Transfer, 116(4):999-1006 (1994).
Chandra et al., Observations of droplet impingement on a ceramic porous surface. International Journal of Heat and Mass Transfer 35(10):2377-2388 (1992).
Chen et al., A Wettability Switchable Surface by Microscale Surface Morphology Change, Journal of Micromechanics & Microengineering, Institute of Physics Publishing, 17(3): 489-195 (2007).
Cummings et al., Oscillations of magnetically levitated aspherical droplets. Journal of Fluid Mechanics, 224:395-416 (1991).
Deng et al., Nonwetting of impinging droplets on textured surfaces. Applied Physics Letters, 94(13) 133109 1-3 (2009).
Elbahri et al., Anti-lotus effect for nanostructuring at the leidenfrost temperature. Advanced Materials, 19(9):1262-1266 (2007).
Feng et al., Design and creation of superwetting/antiwetting surfaces. Advanced Materials, 18(23):3063-3078 (2006).
Fondecave, R. and Wyart, F.B., Polymers as Dewetting Agents, Marcomolecules 31:9305-9315 (1998).
Fujimoto et al., Deformation and rebounding processes of a water droplet impinging on a flat surface above Leidenfrost temperature. Journal of Fluids Engineering, Transactions of the ASME, 118(1):142-149 (1996).
Furmidge, Studies at Phase Interfaces, Journal of Colloid Science, 1962, 17: 309-324.
Gao et al., Artificial lotus leaf prepared using a 1945 patent and a commercial textile. Langmuir, 22(14):5998-6000 (2006).
Goldshtik et al., A liquid drop on an air cushion as an analogue of Leidenfrost boiling. Journal of Fluid Mechanics, 166:1-20 (1986).
Gradeck et al., Heat transfer for Leidenfrost drops bouncing onto a hot surface. Experimental Thermal and Fluid Science, 47:14-25 (2013).
Hashmi et al., Leidenfrost levitation: Beyond droplets. Scientific Reports, 2:797:1-4 (2012).
Hejazi et al., Wetting Transitions in Two-, Three-, and Four-Phase Systems, Langmuir, 28:2173-2180 (2012).
Holden et al., The Use of Organic Coatings to Promote Dropwise Condensation of Steam, Journal of Heat Transfer, 109: 768-774 (1987).
International Preliminary Report on Patentability, PCT/US2011/061498, Feb. 13, 2014, 12 pages.
International Search Report and Written Opinion for PCT/US2011/061498, dated Jul. 31, 2012, 17 pages.
International Search Report, PCT/US2011/061898, Apr. 24, 2013, 6 pages.
International Search Report, PCT/US2012/030370, Oct. 15, 2012, 6 pages.
International Search Report, PCT/US2012/042326, Dec. 3, 2012, 4 pages.
International Search Report, PCT/US2012/042327, May 16, 2013, 6 pages.
International Search Report, PCT/US2013/021558, Oct. 11, 2013, 5 pages.
International Search Report, PCT/US2013/028439, Dec. 5, 2013, 6 pages.
International Search Report, PCT/US2013/042771, May 26, 2014, 4 pages.
International Search Report, PCT/US2013/045731, Nov. 12, 2013, 3 pages.
International Search Report, PCT/US2013/070827, Mar. 27, 2014, 7 pages.

(56) References Cited

OTHER PUBLICATIONS

Iwasa, et al., 'Electromaglev'—Magnetic levitation of a superconducting disc with a DC field generated by electromagnets: Part 1. Theoretical and experimental results on operating modes, lift-to-weight ratio, and suspension stiffness. Cryogenics, 37(12):807-816, (1997).
Jung et al., Are Superhydrophobic Surfaces Best for Icephobicity? Langmuir, 27(6):3059-3066 (2011).
Kim et al., Hierarchical or not? Effect of the length scale and hierarchy of the surface roughness on omniphobicity of lubricant-infused substrates. Nano Letters, 13(4):1793-1799 (2013).
Kim et al., Levitation Time Measurement of Water Drops on the Surface of Liquid Nitrogen, Journal of the Korean Physical Society, vol. 58, No. 6, pp. 1628-1632 (Jun. 2011).
Kim, Heetae, Floating Phenomenon of a Water Drop on the Surface of Liquid Nitrogen, Journal of the Korean Physical Society, vol. 49, No. 4, pp. L1335-L1338 (Oct. 2006).
Kulinich et al., Ice Adhesion on Super-Hydrophobic Surfaces, Applied Surface Science, 2009, 225: 8153-8157.
Lafuma, A. et al., Slippery Pre-Suffused Surfaces; EPL, 96: 56001-p1-56001-p4 (2011).
Lagubeau et al., Leidenfrost on a ratchet. Nature Physics, 7(5):395-398 (2011).
Lee et al., Dynamic Wetting and Spreading Characteristics of a Liquid Droplet Impinging on Hydrophobic Textured Surfaces, Langmuir, (2011), 27, 6565-6573.
Leidenfrost, J. G., On the fixation of water in diverse fire. International Journal of Heat and Mass Transfer, 9(11):1153-1166 (1966).
Li et al., Dynamic Behavior of the Water Droplet Impact on a Textured Hydrophobic/Superhydrophobic Surface: The Effect of the Remaining Liquid Film Arising on the Pillars' Tops on the Contact Time, Langmuir, (2010), 26(7), 4831-4838.
Linke et al., Self-propelled leidenfrost droplets. Physical Review Letters, 96(15) (2006).
Liu et al., Metallic Surfaces with Special Wettability, Nanoscale, 3:825-238 (2011).
Marin et al., Capillary droplets on Leidenfrost micro-ratchets. arXiv preprint arXiv:1210.4978 (2012).
Meuler et al., Exploiting Topographical Texture To Impact Icephobicity, ACS Nano, 2010, 4(12): 7048-7052.
Mills, A. A., Pillow lavas and the Leidenfrost effect. Journal of the Geological Society, 141(1):183-186 (1984).
Mishchenko et al., Design of ice-free nanostructured surfaces based on repulsion of impacting water droplets. ACS Nano, 4(12):7699-7707 (2010).
Onda et al., Super-water-repellent fractal surfaces. Langmuir, 12(9) (1996).
Ou et al., Laminar drag reduction in microchannels using ultrahydrophobic surfaces. Physics of Fluids, 16(12):4635-4643 (2004).
Park et al., A Numerical Study of the Effects of Superhydrophobic Surface on Skin-Friction Drag in Turbulent Channel Flow, Phys. Fluids 25, 110815 (2013).
Piroird et al., Magnetic control of Leidenfrost drops. Physical Review E—Statistical, Nonlinear, and Soft Matter Physics, 85(5) (2012).
Pozzato et al., Superhydrophobic surfaces fabricated by nanoimprint lithography, Microelectronic Engineering, 83, (2006), 884-888.
Prat et al., On the effect of surface roughness on the vapor flow under Leidenfrost-Levitated droplets. Journal of Fluids Engineering, Transactions of the ASME, 117(3):519-525 (1995).
Quéré et al., Surfing the hot spot. Nature Materials, 5(6):429-430 (2006).
Quéré, D., Leidenfrost dynamics, Annu. Rev. Fluid Mech., 197-215 (2013).
Quéré, D., Non-sticking drops, Institute of Physics Publishing, Rep. Prog.Phys., 68(11):2495-2532 (2005).
Rausch et al., On the Characteristics of Ion Implanted Metallic Surfaces Inducing Dropwise Condensation of Steam, Langmuir, 26(8): 5971-5975 (2010).
Reyssat et al., Dynamical superhydrophobicity. Faraday Discussions, 146:19-33 (2010).
Reyssat, et al., Bouncing transitions on microtextured materials. Europhysics Letters, 74(2):306-312 (2006).
Richard, D. et al., Contact time of a bouncing drop, Nature 417:(6891):811 (2002).
Roosen et al., Optical levitation by means of two horizontal laser beams: a theoretical and experimental study. Physics Letters A, 59(1):6-8 (1976).
Rothstein, J. P., Slip on superhydrophobic surfaces, ANRV400-FL42-05, ARI, 89-109 (2010).
Rykaczewski et al., Mechanism of Frost Formation of Lubricant-Impregnated Surfaces, Langmuir 2013, 29 5230-5238, 13 pages.
Seiwert et al., Coating of a Textured Solid, J. Fluid Mech., 2011, 669: 55-63.
Sekeroglu et al., Transport of a soft cargo on a nanoscale ratchet. Applied Physics Letters, 99(6) (2011).
Smith et al., Droplet Mobility on Lubricant-Impregnated Surfaces, Soft Matter, 2012(9): 1772-1780 (2012).
Smith et al., Liquid-encapsulating surfaces: overcoming the limitations of superhydrophobic surfaces for robust non-wetting and anti-icing surfaces. in Bulletin of the American Physical Society (2011) Abstract Only.
Snoeijer et al., Maximum size of drops levitated by an air cushion. Physical Review E—Statistical, Nonlinear, and Soft Matter Physics, 79(3) (2009).
Song et al., Superhydrophobic Surfaces Produced by Applying a Self-Assembled Monolayer to Silicon Micro/Nano-Textured Surfaces, Nano Research, 2009, 2: 143-150.
Song et al., Vitrification and levitation of a liquid droplet on liquid nitrogen, PNAS Early Edition, pp. 1-5 (2010).
Trinh et al., The dynamics of ultrasonically levitated drops in an electric field. Physics of Fluids, 8(1):43-61 (1996).
Tuteja et al., Designing superoleophobic surfaces. Science, 318(5856):1618-1622 (2007).
Tuteja et al., Robust omniphobic surfaces. Proceedings of the National Academy of Sciences of the United States of America, 105(47):18200-18205 (2008).
Vakarelski et al., Drag reduction by leidenfrost vapor layers. Physical Review Letters, 106(21) (2011).
Vakarelski et al., Stabilization of Leidenfrost vapour layer by textured superhydrophobic surfaces. Nature, 489(7415):274-277 (2012).
Varanasi et al., Frost formation and ice adhesion on superhydrophobic surfaces. Applied Physics Letters, 97(23) (2010).
Varanasi et al., Spatial Control in the Heterogeneous Nucleation of Water, Applied Physics Letters, 95: 094101-01-03 (2009).
Weber et al., Aero-acoustic levitation: A method for containerless liquid-phase processing at high temperatures. Review of Scientific Instruments, 65(2):456-465 (1994).
Weickgenannt et al., Inverse-Leidenfrost phenomenon on nanofiber mats on hot surfaces. Physical Review E—Statistical, Nonlinear, and Soft Matter Physics, 84(3) (2011).
Weilert et al., Magnetic levitation and noncoalescence of liquid helium. Physical Review Letters, 77(23):4840-4843 (1996).
Welter et al., Acoustically levitated droplets—A new tool for micro and trace analysis. Fresenius' Journal of Analytical Chemistry, 357(3):345-350 (1997).
Wenzel, Resistance of Solid Surfaces to Wetting by Water, Industrial & Engineering Chemistry, 28(8): 988-994 (1936).
Wong et al., Bioinspired Self-Repairing Slippery Surfaces with Pressure-Stable Omniphobicity, Nature, 477(7365):443-447 (2011).
Written Opinion, PCT/US2011/061898, Apr. 24, 2013, 9 pages.
Written Opinion, PCT/US2012/030370, Oct. 15, 2012, 10 pages.
Written Opinion, PCT/US2012/042326, Dec. 3, 2012, 7 pages.
Written Opinion, PCT/US2012/042327, May 16, 2013, 6 pages.
Written Opinion, PCT/US2013/021558, Oct. 11, 2013, 7 pages.
Written Opinion, PCT/US2013/028439, Dec. 5, 2013, 11 pages.
Written Opinion, PCT/US2013/042771, May 26, 2014, 7 pages.
Written Opinion, PCT/US2013/045731, Nov. 12, 2013, 3 pages.
Written Opinion, PCT/US2013/070827, Mar. 27, 2014, 15 pages.
Würger, A., Leidenfrost gas ratchets driven by thermal creep. Physical Review Letters, 107(16) (2011).

(56) References Cited

OTHER PUBLICATIONS

Yarin et al., On the acoustic levitation of droplets. Journal of Fluid Mechanics, 356:65-91 (1998).
Yasuda et al., Levitation of metallic melt by using the simultaneous imposition of the alternating and the static magnetic fields. Journal of Crystal Growth, 260(3-4):475-485 (2004).
Yu et al., Containerless solidification of oxide material using an electrostatic levitation furnace in microgravity. Journal of Crystal Growth, 231(4):568-576 (2001).
Zhao et al., Dropwise condensation of Steam on Ion Implanted Condenser Surfaces, Heat Recovery Systems & CHP, 14(5): 525-534 (1994).
Chaudhuri et al., Dynamic Contact Angles on PTFE Surface by Aqueous Surfactant Solution in Absence and Presence of Electrolytes, Journal of Colloid and Interface Science, 337:555-562 (2009).
Good, Robert J., Contact angle, wetting and adhesion: a critical review, J. Adhesion Sci. Technol. vol. 6, No. 12, pp. 1269-1302 (1992).
International Preliminary Report on Patentability for PCT/US2011/049187, dated Mar. 7, 2013, 8 pages.
International Search Report for PCT/US2011/049187, dated Jan. 23, 2013, 4 pages.
Sum, Amadeu K. et al, Clathrate Hydrates: From Laboratory Science to Engineering Practice, American Chemical Society, Ind. Eng. Chem. Res., vol. 48, No. 16, pp. 7457-7465, Jul. 22, 2009, 9 pages.
Tropmann et al., Completely Superhydrophobic PDMS Surfaces for Microfluidics, Langmuir, ACS Publications (2012).
Written Opinion for PCT/US2011/049187, dated Jan. 23, 2013, 7 pages.
International Search Report for PCT/US2014/066227, dated Mar. 3, 2015, 3 pages.
Written Opinion for PCT/US2014/066227, dated Mar. 3, 2015, 6 pages.
International Preliminary Report on Patentability, PCT/US14/66227, 4 Pages, Feb. 2, 2016.

* cited by examiner

ARTICLES FOR MANIPULATING IMPINGING LIQUIDS AND METHODS OF MANUFACTURING SAME

CROSS-REFERENCE TO RELATED APPLICATION

This application is a Divisional of U.S. patent application Ser. No. 13/300,022, filed on Nov. 18, 2011 which claims priority to and the benefit of, U.S. Provisional Patent Application No. 61/514,794, which was filed on Aug. 3, 2011, both of which are incorporated herein by reference in their entireties.

GOVERNMENT SUPPORT

This invention was made with Government support under Grant No. CBET-0952564 awarded by the National Science Foundation and under Grant No. N66001-10-1-4047 awarded by the Space and Naval Warfare Systems Center. The Government has certain rights in this invention.

FIELD OF THE INVENTION

This invention relates generally to surfaces that manipulate impinging liquids. More particularly, in certain embodiments, the invention relates to macro-scale features on a surface that reduce the contact time between an impinging liquid and the surface.

BACKGROUND OF THE INVENTION

Superhydrophobicity, a property of a surface when it resists contact with water, has been a topic of intense research during the last decade due to its potential in a wide variety of applications, such as self-cleaning, liquid-solid drag reduction, and water repellency. Water repellency of superhydrophobic surfaces is often studied by droplet impingement experiments in which millimetric drops of water are impacted onto these surfaces and photographed. With appropriate surface design, droplets can be made to bounce off completely. However, the time taken to bounce off—hereafter referred to as the contact time—is critically important as mass, momentum, and/or energetic interactions take place between the droplet and the surface during the time of contact. For example, the energy required to deice an airplane wing can be reduced if a water drop rebounds off the wing before it freezes.

Recent literature suggests there is a theoretical minimum contact time, $t_c$. See M. Reyssat, D. Richard, C. Clanet, and D. Quere, *Faraday Discuss.*, 2010, 146, pp. 19-33; and D. Quere, *Nature Letters*, 2002, 417, pp. 811. Specifically, models that estimate the effects of contact line pinning on contact time have found that the contact time scales as $$t_c \approx 2.2 \left(\frac{\rho R^3}{\gamma}\right)^{1/2} \left(1 + \frac{\phi}{4}\right) \quad (1)$$

where $t_c$ is the contact time of a drop, of radius R, density $\rho$, and surface tension $\gamma$, bouncing on a superhydrophobic surface with pinning fraction $\phi$. Even if one were able to completely eliminate this surface pinning such that $\phi=0$, there would still be a minimum contact time limited by the drop hydrodynamics.

New articles, devices, and methods are needed to decrease the contact time between a droplet and a surface for improved liquid repellency. Contact times less than the theoretical minimum have heretofore been believed to be impossible.

SUMMARY OF THE INVENTION

The articles, devices, and methods presented herein incorporate unique surface designs that can manipulate the morphology of an impinging droplet and lead to a significant reduction (e.g., more than 50% below the theoretical minimum prediction of Equation 1) in the time of contact between a droplet and its target surface. These designs are capable of improving the performance of a wide variety of products that are negatively affected by droplet impingement. Examples of such products include rainproof consumer products, steam turbine blades, wind turbine blades, aircraft wings, engine blades, gas turbine blades, atomizers, and condensers.

The articles, devices, and methods described herein offer several advantages over previous approaches in the field of water repellency using superhydrophobic surfaces. For example, the articles, devices, and methods lead to a major reduction (e.g., over 50%) in the contact time compared to the existing best reported contact time in the literature (i.e., the minimum contact time predicted by Equation 1, above). This surprising reduction in contact time is desirable not only to control diffusion of mass, momentum, or energy (depending upon the application), but also to prevent droplets from getting stuck on a surface due to impact from neighboring impinging droplets. In addition, the approach described herein is more practical and scalable as it relies on introducing macro-scale features that are easy to machine or fabricate with current tools. By contrast, previous approaches focus on the use of micron to sub-micron features that are difficult to fabricate and, at best, provide contact times that approach but do not fall below the minimum predicted by Equation 1. Contact times achieved using the articles, devices, and methods described herein are lower than those attainable with the lotus leaf (the best known superhydrophobic surface), which is limited by Equation 1.

The articles, devices, and methods described herein may be used in a wide variety of industries and applications where droplet repellency is desirable. For example, textile companies that manufacture rainproof fabrics, such as rainwear, umbrellas, automobile covers, etc., could significantly improve fabric waterproof performance. Likewise, energy companies that manufacture steam turbines could reduce moisture-induced efficiency losses caused by water droplets entrained in steam, which impinge on turbine blades and form films, thereby reducing power output. Condensers in power and desalination plants may utilize the devices and methods described herein to promote dropwise shedding condensation heat transfer. Further, in aircraft and wind turbine applications, a reduced contact time of supercooled water droplets impinging upon aircraft surfaces is desirable to prevent the droplets from freezing and thereby degrading aerodynamical performance. In atomizer applications, the ability of surfaces to break up droplets can be used to create new atomizers for applications in engines, agriculture, and pharmaceutical industries. In gas turbine compressors, the devices and methods described herein may be used to prevent oil-film formation and reduce fouling.

In one aspect, the invention relates to an article including a non-wetting surface having a dynamic contact angle of at least about 90°, said surface patterned with macro-scale features configured to induce controlled asymmetry in a liquid film produced by impingement of a droplet onto the surface, thereby reducing time of contact between the droplet and the surface. In certain embodiments, the non-wetting surface is superhydrophobic, superoleophobic, and/or supermetallophobic. In one embodiment, the surface includes a non-wetting material. The surface may be heated above its Leidenfrost temperature.

In certain embodiments, the surface includes non-wetting features, such as nanoscale pores. In certain embodiments, the macro-scale features include ridges having height $A_r$ and spacing $\lambda_r$, with $A_r/h$ greater than about 0.01 and $\lambda_r/A_r$ greater than or equal to about 1, wherein h is lamella thickness upon droplet impingement onto the surface. In certain embodiments, $A_r/h$ is from about 0.01 to about 100 and $\lambda_r/A_r$ is greater than or equal to about 1. In one embodiment, $A_r/h$ is from about 0.1 to about 10 and $\lambda_r/A_r$ is greater than or equal to about 1.

In certain embodiments, the article is a wind turbine blade, the macro-scale features include ridges having height $A_r$ and spacing $\lambda_r$, and wherein 0.0001 mm<$A_r$ and $\lambda_r \geq 0.0001$ mm. In certain embodiments, the article is a rainproof product, 0.0001 mm<$A_r$ and $\lambda_r$>0.0001 mm. In some embodiments, the article is a steam turbine blade, 0.00001 mm<$A_r$ and $\lambda_r$>0.0001 mm. In one embodiment, the article is an exterior aircraft part, 0.00001 mm<$A_r$ and $\lambda_r$>0.0001 mm. The article may be a gas turbine blade with 0.00001 mm<$A_r$ and $\lambda_r$>0.0001 mm.

In certain embodiments, the macro-scale features include protrusions having height $A_p$ and whose centers are separated by a distance $\lambda_p$, with $A_p/h$>0.01 and $\lambda_p/A_p \geq 2$, wherein h is lamella thickness upon droplet impingement onto the surface. In certain embodiments, 100>$A_p/h$>0.01 and $\lambda_p/A_p \geq 2$. In one embodiment, 10>$A_p/h$>0.1 and $\lambda_p/A_p \geq 2$. The macro-scale features may be hemispherical protrusions.

In certain embodiments, the article is a wind turbine blade, the macro-scale features include protrusions having height $A_p$ and whose centers are separated by a distance $\lambda_p$, and wherein 0.0001 mm<$A_p$ and $\lambda_p \geq 0.0002$ mm. In certain embodiments, the article is a rainproof product, 0.0001 mm<$A_p$ and $\lambda_p \geq 0.0002$ mm. In various embodiments, the article is a steam turbine blade, 0.00001 mm<$A_p$ and $\lambda_p \geq 0.00002$ mm. In certain embodiments, the article is an exterior aircraft part, 0.00001 mm<$A_p$ and $\lambda_p \geq 0.00002$ mm. The article may be a gas turbine blade with 0.00001 mm<$A_p$ and $\lambda_p \geq 0.00002$ mm.

In certain embodiments, the macro-scale features include a sinusoidal profile having amplitude $A_c$ and period $\lambda_c$, with $A_c/h$>0.01 and $\lambda_c/A_c \geq 2$, wherein h is lamella thickness upon droplet impingement onto the surface. In certain embodiments, 100>$A_c/h$>0.01 and 500$\geq \lambda_c/A_c$>2. In various embodiments, 100>$A_c/h$>0.1 and 500$\geq \lambda_c/A_c \geq 2$. As used herein, "sinusoidal" encompasses any curved shape with an amplitude and period.

In certain embodiments, the article is a rainproof product, the macro-scale features include a sinusoidal profile having amplitude $A_c$ and period $\lambda_c$, and wherein 0.0001 mm<$A_c$ and $\lambda_c \geq 0.0002$ mm. In one embodiment, the article is a wind turbine blade, 0.0001 mm<$A_c$ and $\lambda_c \geq 0.0002$ mm. The article may be a steam turbine blade with 0.00001 mm<$A_c$ and $\lambda_c \geq 0.00002$ mm. The article may be an exterior aircraft part with 0.00001 mm<$A_c$ and $\lambda_c \geq 0.00002$ mm. In certain embodiments, the article is a gas turbine blade, 0.00001 mm<$A_c$ and $\lambda_c \geq 0.00002$ mm.

In certain embodiments, the surface includes an alkane. In one embodiment, the surface includes a fluoropolymer. In certain embodiments, the surface includes at least one member selected from the group consisting of teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS, a ceramic material, a polymeric material, a fluorinated material, an intermetallic compound, and a composite material. In certain embodiments, the surface includes a polymeric material, the polymeric material including at least one of polytetrafluoroethylene, fluoroacrylate, fluoroeurathane, fluorosilicone, fluorosilane, modified carbonate, chlorosilanes, and silicone. In certain embodiments, the surface includes a ceramic material, the ceramic material including at least one of titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, and fluorinated diamond-like carbon. In certain embodiments, the surface includes an intermetallic compound, the intermetallic compound including at least one of nickel aluminide and titanium aluminide. In certain embodiments, the article is a condenser. The article may be a drip shield for storage of radioactive material. In certain embodiments, the article is a self-cleaning solar panel.

In another aspect, the invention relates to an atomizer including a non-wetting surface having a dynamic contact angle of at least about 90°, said surface patterned with macro-scale features configured to induce controlled asymmetry in a liquid film produced by impingement of a droplet onto the surface, thereby promoting breakup of the droplet on the surface. The description of elements of the embodiments above can be applied to this aspect of the invention as well. In certain embodiments, the non-wetting surface is supermetallophobic. In certain embodiments, the droplet includes a molten metal.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

DETAILED DESCRIPTION

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where devices and systems are described as having, including, or comprising specific components, or where processes and methods are described as having, including, or comprising specific steps, it is contemplated that, additionally, there are systems of the present invention that consist essentially of, or consist of, the recited components, and that there are processes and methods according to the present invention that consist essentially of, or consist of, the recited processing steps.

Similarly, where devices, mixtures, and compositions are described as having, including, or comprising specific compounds and/or materials, it is contemplated that, additionally, there are mixtures and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Figure 1A:
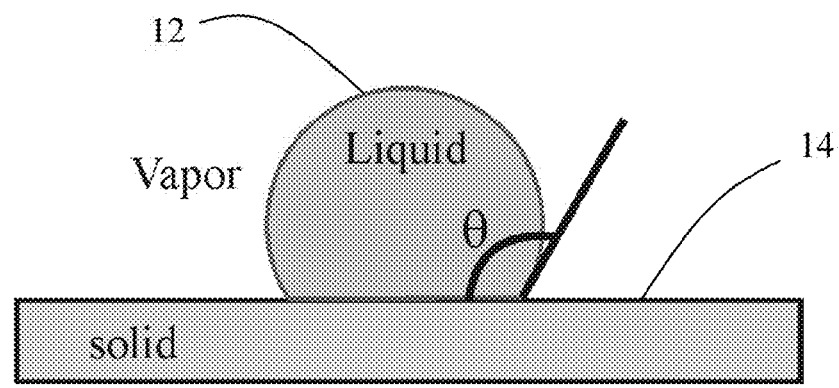
FIG. 1a is a schematic side view of a droplet resting on a surface during a static contact angle measurement, according to an illustrative embodiment of the invention.

Referring to FIG. 1a, in certain embodiments, a static contact angle θ between a liquid and solid is defined as the angle formed by a liquid drop 12 on a solid surface 14 as measured between a tangent at the contact line, where the three phases—solid, liquid, and vapor—meet, and the horizontal. The term "contact angle" usually implies the static contact angle θ since the liquid is merely resting on the solid without any movement.

Figure 1B:
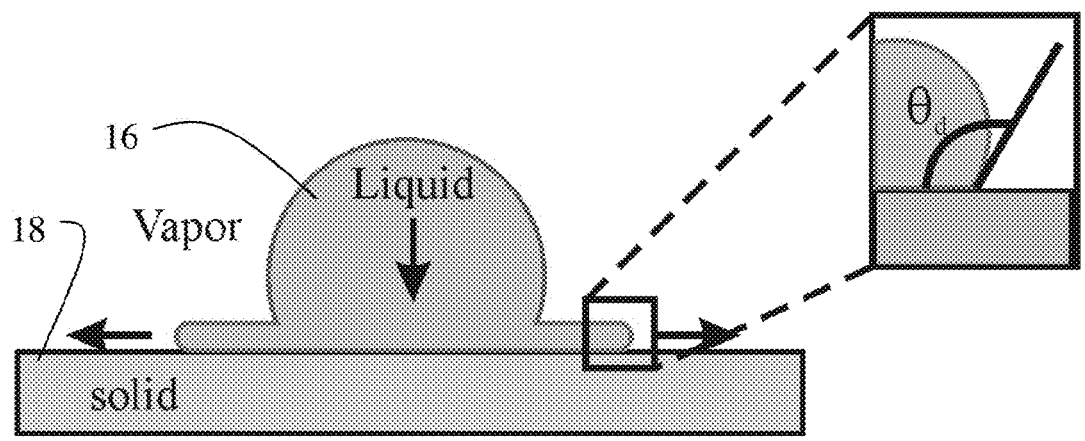
FIGS. 1b and 1c are schematic side views of a liquid spreading and receding, respectively, on a surface, according to an illustrative embodiment of the invention.
Figure 1C:
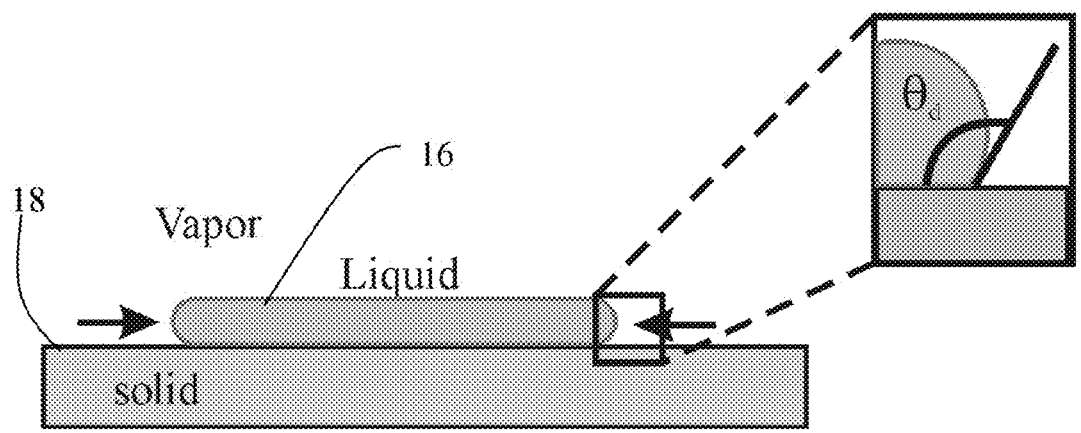

As used herein, dynamic contact angle, $\theta_d$, is a contact angle made by a moving liquid 16 on a solid surface 18. In the context of droplet impingement, $\theta_d$ may exist during either advancing or receding movement, as shown in FIGS. 1b and 1c, respectively.

As used herein, a surface is "non-wetting" if it has a dynamic contact angle with a liquid of at least 90 degrees. Examples of non-wetting surfaces include, for example, superhydrophobic surfaces and superoleophobic surfaces.

Figure 1D:
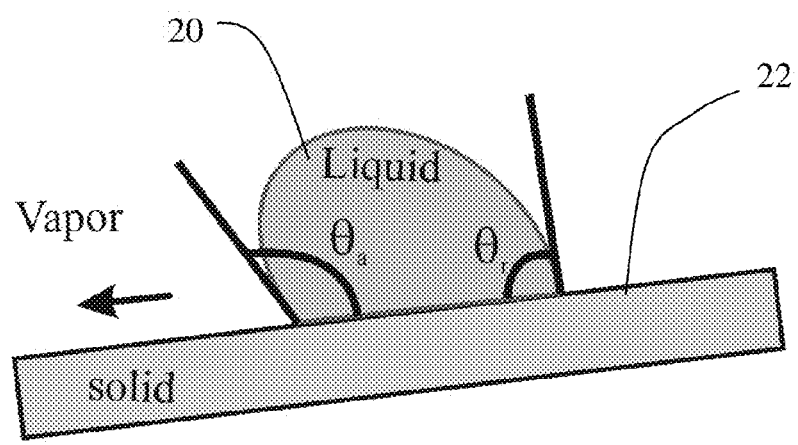
FIG. 1d is a schematic side view of a droplet resting on an angled surface, according to an illustrative embodiment of the invention.

As used herein, contact angle hysteresis (CAH) is $$CAH = \theta_a - \theta_r \quad (2)$$

where $\theta_a$ and $\theta_r$ are advancing and receding contact angles, respectively, formed by a liquid 20 on a solid surface 22. Referring to FIG. 1d, the advancing contact angle $\theta_a$ is the contact angle formed at the instant when a contact line is about to advance, whereas the receding contact angle $\theta_r$ is the contact angle formed when a contact line is about to recede.

As used herein, "non-wetting features" are physical textures (e.g., random, including fractal, or patterned surface roughness) on a surface that, together with the surface chemistry, make the surface non-wetting. In certain embodiments, non-wetting features result from chemical, electrical, and/or mechanical treatment of a surface. In certain embodiments, an intrinsically hydrophobic surface may become superhydrophobic when non-wetting features are introduced to the intrinsically hydrophobic surface. Similarly, an intrinsically oleophobic surface may become superoleophobic when non-wetting features are introduced to the intrinsically oleophobic surface. Likewise, an intrinsically metallophobic surface may become supermetallophobic when non-wetting features are introduced to the intrinsically metallophobic surface.

In certain embodiments, non-wetting features are micro-scale or nano-scale features. For example, the non-wetting features may have a length scale $L_n$ (e.g., an average pore diameter, or an average protrusion height) that is less than about 100 microns, less than about 10 microns, less than about 1 micron, less than about 0.1 microns, or less than about 0.01 microns. Compared to a length scale $L_m$ associated with macro-scale features, described herein, the length scales for the non-wetting features are typically at least an order of magnitude smaller. For example, when a surface includes a macro-scale feature that has a length scale $L_m$ of 1 micron, the non-wetting features on the surface have a length scale $L_n$ that is less than 0.1 microns. In certain embodiments a ratio of the length scale for the macro-scale features to the length scale for the non-wetting features (i.e., $L_m/L_n$) is greater than about 10, greater than about 100, greater than about 1000, or greater than about 10,000.

As used herein, a "superhydrophobic" surface is a surface having a static contact angle with water of at least 120 degrees and a CAH of less than 30 degrees. In certain embodiments, an intrinsically hydrophobic material (i.e., a material having an intrinsic contact angle with water of at least 90 degrees) exhibits superhydrophobic properties when it includes non-wetting features. For superhydrophobicity, typically nano-scale non-wetting features are preferred. Examples of intrinsically hydrophobic materials that exhibit superhydrophobic properties when given non-wetting features include: hydrocarbons, such as alkanes, and fluoropolymers, such as teflon, trichloro(1H,1H,2H,2H-perfluorooctyl)silane (TCS), octadecyltrichlorosilane (OTS), heptadecafluoro-1,1,2,2-tetrahydrodecyltrichlorosilane, and fluoroPOSS.

As used herein, a "superoleophobic" surface is a surface having a static contact angle with oil of at least 120 degrees and a CAH with oil of less than 30 degrees. The oil may be, for example, a variety of liquid materials with a surface tension much lower than the surface tension of water. Examples of such oils include alkanes (e.g., decane, hexadecane, octane), silicone oils, and fluorocarbons. In certain embodiments, an intrinsically oleophobic material (i.e., a material having an intrinsic contact angle with oil of at least 90 degrees) exhibits superoleophobic properties when it includes non-wetting features. The non-wetting features may be random or patterned. Examples of intrinsically oleophobic materials that exhibit superoleophobic properties when given non-wetting features include: teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS, and other fluoropolymers.

As used herein, a "supermetallophobic" surface is a surface having a static contact angle with a liquid metal of at least 120 degrees and a CAH with liquid metal of less than 30 degrees. In certain embodiments, an intrinsically metallophobic material (i.e., a material having an intrinsic contact angle with liquid metal of at least 90 degrees) exhibits supermetallophobic properties when it includes non-wetting features. The non-wetting features may be random or patterned. Examples of intrinsically metallophobic materials that exhibit supermetallophobic properties when given non-wetting features include: teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS, and other fluoropolymers. Examples of metallophobic materials include molten tin on stainless steel, silica, and molten copper on niobium.

In certain embodiments, intrinsically hydrophobic materials and/or intrinsically oleophobic materials include ceramics, polymeric materials, fluorinated materials, intermetallic compounds, and composite materials. Polymeric materials may include, for example, polytetrafluoroethylene, fluoroacrylate, fluoroeurathane, fluorosilicone, fluorosilane, modified carbonate, chlorosilanes, silicone, and/or combinations thereof. Ceramics may include, for example, titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon, and/or combinations thereof. Intermetallic compounds may include, for example, nickel aluminide, titanium aluminide, and/or combinations thereof.

As used herein, an intrinsic contact angle is a static contact angle formed between a liquid and a perfectly flat, ideal surface. This angle is typically measured with a goniometer. The following publications, which are hereby incorporated by reference herein in their entireties, describe additional methods for measuring the intrinsic contact angle: C. Allain, D. Aussere, and F. Rondelez, *J. Colloid Interface Sci.*, 107, 5 (1985); R. Fondecave, and F. Brochard-Wyart, *Macromolecules*, 31, 9305 (1998); and A. W. Adamson, *Physical Chemistry of Surfaces* (New York: John Wiley & Sons, 1976).

When a liquid droplet impacts a non-wetting surface, the droplet will spread out on the surface and then begin to recoil. For highly non-wetting surfaces, the droplet can completely rebound from the surface. Through the impact dynamics, the shape of the droplet is generally axisymmetric so that, at any point in time during recoil, the wetted area is substantially circular. By patterning the surface, however, this symmetry may be disrupted and the impact dynamics may be altered or controlled. For example, by controlling or defining macro-scale features on the surface, the contact time of the droplet may be increased or decreased, instabilities may be created that cause the droplet to break-up into smaller droplets, and spatial control may be gained over how long a particular drop, or part of that drop, is in contact with the surface.

During the time of contact between a droplet and a surface, heat, mass, and momentum diffuse between the droplet and the surface. By controlling the time that a droplet contacts a particular location on the surface, this diffusion may be optimized both temporally and spatially. In certain embodiments, surface patterns or features are developed that influence the recoil of droplets in two distinct ways: (1) patterns that introduce concavity to the receding boundary, and (2) patterns that introduce surface curvature to the film in such a way that capillary pressure delaminates the spread-out droplet from the surface.

The speed at which a spread-out droplet recedes depends not only on the material properties of the droplet, but also the properties of the surface the droplet contacts. On non-wetting surfaces, the drop recoiling speed is reduced by the dissipation or contact angle hysteresis from the surface. Variations in dissipation may be achieved by changing the structure and/or chemistry of the surface patterns that form the non-wetting surface. For example, the density of patterns such as posts can influence the recoiling speed of drops. Dissipation in the system may be added using a variety of tools, such as flexible structures at various length scales. In addition, while a pattern of posts can break the symmetry of receding films, the drops may remain convex.

In certain embodiments, surfaces are designed that introduce concavity into the receding film. Using these designs, the surfaces are tailored so that the exposure to droplets in certain regions is longer than it is in other regions. In one embodiment, concavity breaks the film into separate drops, and the concavity is augmented by natural capillary instabilities. For example, the surface may be patterned so the recoil of the drop in one direction is significantly slower than in a perpendicular direction. The resulting recoil forms a cylinder which quickly becomes concave and breaks up into droplets via a Rayleigh-Plateau type instability.

A limitation in the surface pinning approach is that it may slow down the drop dynamics. The minimum contact time a drop makes with a surface is believed to be minimized when that surface approaches a 180 degree contact angle with no contact angle hysteresis, the equivalent of impacting on a thin air layer. As described herein, however, a shorter contact time is possible using patterned surfaces. Specifically, if during the recoiling stage, the contact line increases while the surface area decreases, there are more fronts on which the droplet can recoil. It is therefore possible for the drop to recede more quickly than if the drop were receding symmetrically, so that the total contact time for the drop is reduced. As described below, in certain embodiments, concavity is introduced by speeding up the recoil of portions of the receding film.

Figure 1E:
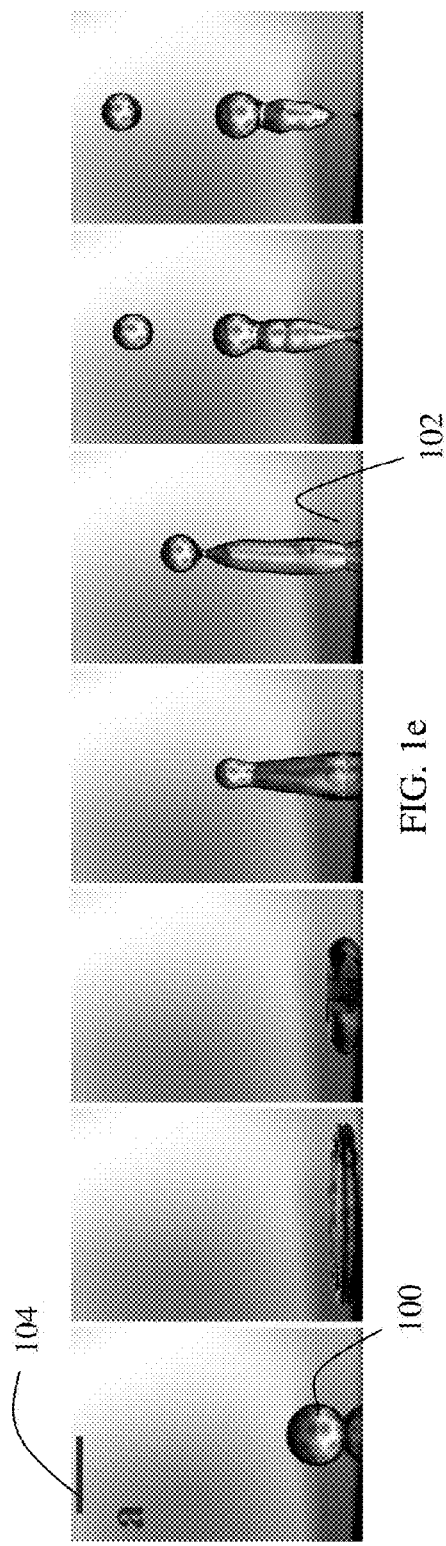
FIGS. 1e and 1f depict typical side and top views, respectively, of a water droplet (2.7 mm in diameter) impinging a superhydrophobic surface, according to an illustrative embodiment of the invention.
Figure 1F:
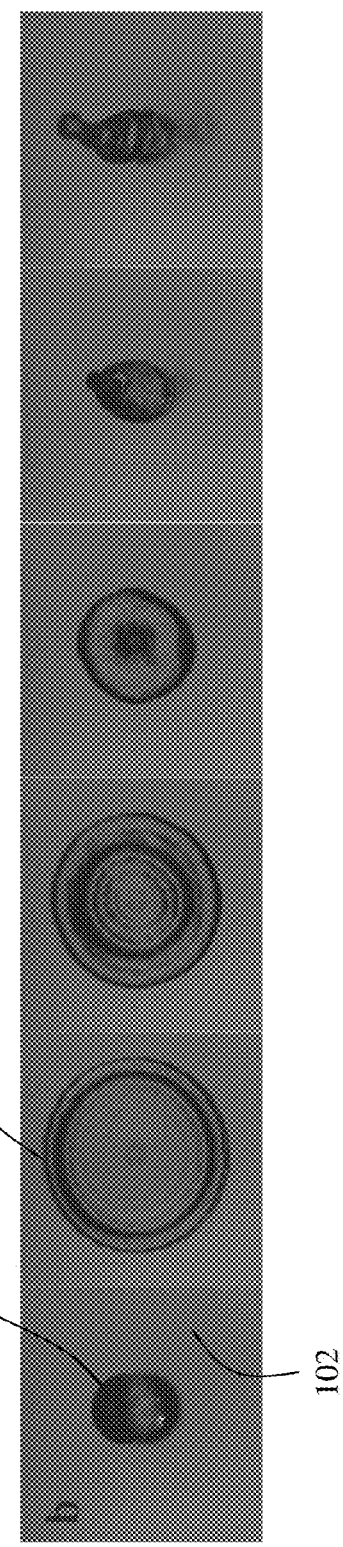
Figure 2A:
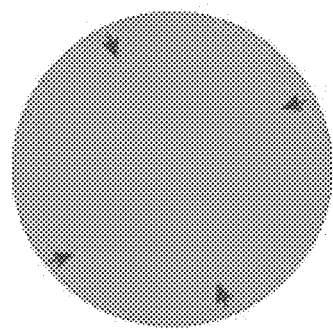
FIG. 2a is a schematic top view of a droplet undergoing symmetrical recoil, similar to FIG. 1b, after impingement, according to an illustrative embodiment of the invention.
Figure 2B:
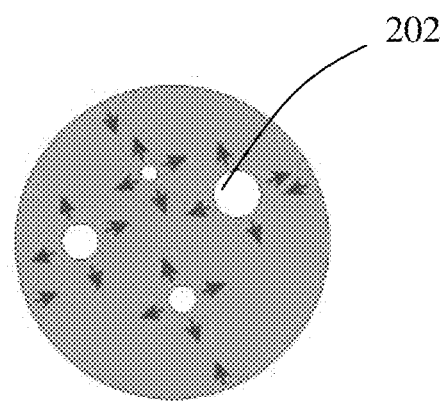
FIG. 2b is a schematic top view of a droplet undergoing asymmetric recoil due to nucleation of holes, according to an illustrative embodiment of the invention.
Figure 2C:
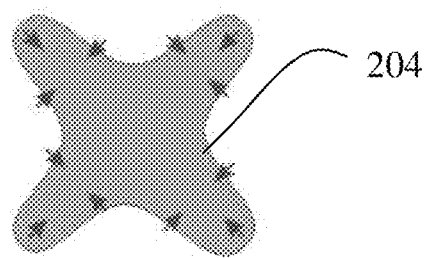
FIG. 2c is a schematic top view of a droplet undergoing asymmetrical recoil due to development of cracks, according to an illustrative embodiment of the invention.
Figure 2D:
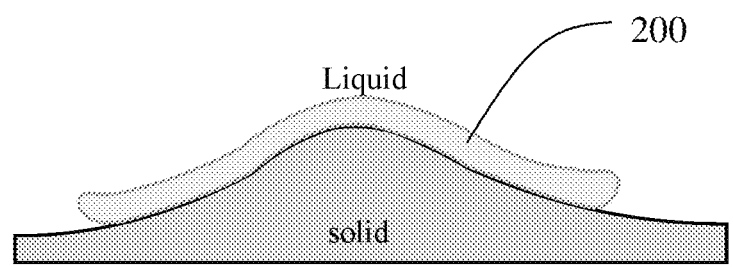
FIG. 2d is a schematic side view of a droplet that has spread onto a curved surface to form a lamella, according to an illustrative embodiment of the invention.

FIGS. 1e and 1f depict side and top views, respectively, of a water droplet 100 bouncing on a superhydrophobic surface 102. The surface 102 includes an array of 10 µm square posts of silicon spaced 3 µm apart. The contact time in this case, measured from the leftmost image to the rightmost in these figures, is about 19 ms. The scale bar 104 in the leftmost image of FIG. 1e is 3 mm. FIG. 1f shows that the droplet spreads and recedes with a largely symmetrical (circular) edge 106.

In certain embodiments, the devices and methods presented herein reduce the contact time between an impinging droplet and a surface by modifying surface textures associated with the surface. Surprisingly, these devices and methods reduce the contact time to below the theoretical limit indicated by Equation 1, above. In one embodiment, by appropriately designing the superhydrophobic surface, contact times are further decreased to about one half of this theoretical limit.

In certain embodiments, the devices and methods described herein incorporate macro-scale features (e.g., ridges, sinusoids, protrusions) into a superhydrophobic surface to trigger controlled asymmetry in the liquid film produced by droplet impingement. The macro-scale features may have, for example, a height greater than about 0.00001 mm, greater than about 0.0001 mm, greater than about 0.001 mm, greater than about 0.01 mm, greater than about 0.1 mm, or greater than about 1 mm. Additionally, the macro-scale features may have, for example, a spacing (e.g., a spacing between ridges, peaks, or valleys) greater than about 0.00001 mm, greater than about 0.0001 mm, greater than about 0.001 mm, greater than about 0.01 mm, greater than about 0.1 mm, or greater than about 1 mm.

Referring to FIGS. 2a-2d, the asymmetry in a liquid film 200, in the form of cracks 204, holes 202, and curvature, introduced by the macro-scale features, leads to droplet recoiling at multiple fronts and, hence, produces a significant reduction in the contact time. This idea is distinctly different from previous approaches which typically included smaller features (e.g., 100 nm) and, more importantly, attempted to minimize the contact line pinning between the drop and these features.

Figure 3:
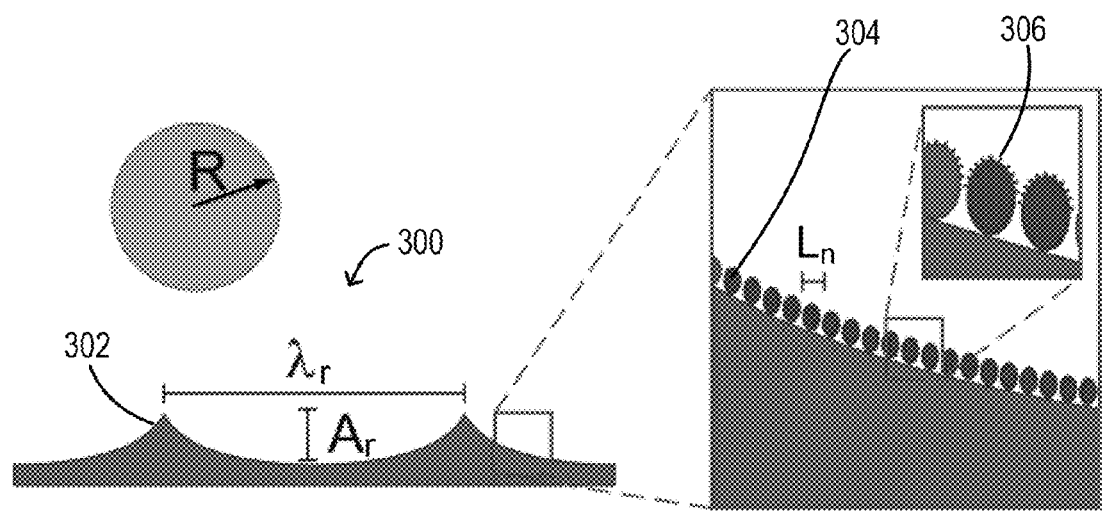
FIG. 3 is a schematic side view and a detailed view of a surface for triggering cracks in a receding liquid film, according to an illustrative embodiment of the invention.

In one embodiment, a superhydrophobic surface 300 includes macro-scale ridges 302 that trigger cracks in a liquid film upon impingement of a droplet having radius R. As depicted in FIG. 3, the ridges 302 have a ridge height $A_r$ and a ridge spacing $\lambda_r$. The ridges 302 may have any cross-sectional shape, including curved and pointed (as shown in FIG. 3), triangular, hemispherical, and/or rectangular. Typically, each ridge 302 has a ridge length (along the surface 300) that is much greater than the ridge height $A_r$ and/or ridge spacing $\lambda_r$. For example, a ridge 302 may have a ridge height $A_r$ of about 0.1 mm and a ridge length (e.g., along a ridge longitudinal axis) of about 100 mm or more. To achieve or maintain superhydrophobicity, the surface 300 includes non-wetting features 304 having a length scale $L_n$ (e.g., an average diameter or cross-dimension). In certain embodiments, the non-wetting features 304 are chosen so that $\theta_d$ is greater than 90 degrees and CAH is less than about 30 degrees, less than about 20 degrees, or less than about 10 degrees. As depicted, the non-wetting features may include smaller features 306, if necessary, to facilitate non-wetting.

Referring again to FIGS. 1b and 1c, when a liquid droplet impinges a solid surface, the droplet spreads into a thin lamella or film having a thickness h. In certain embodiments, a ratio of the ridge height $A_r$ to the thickness h (i.e., $A_r/h$) is greater than about 0.01. For example, $A_r/h$ may be from about 0.01 to about 100, from about 0.1 to about 10, or from about 0.1 to about 5. In certain embodiments, a ratio of the ridge spacing $\lambda_r$ to the ridge height $A_r$ is greater than or equal to about 1.

Figure 4:
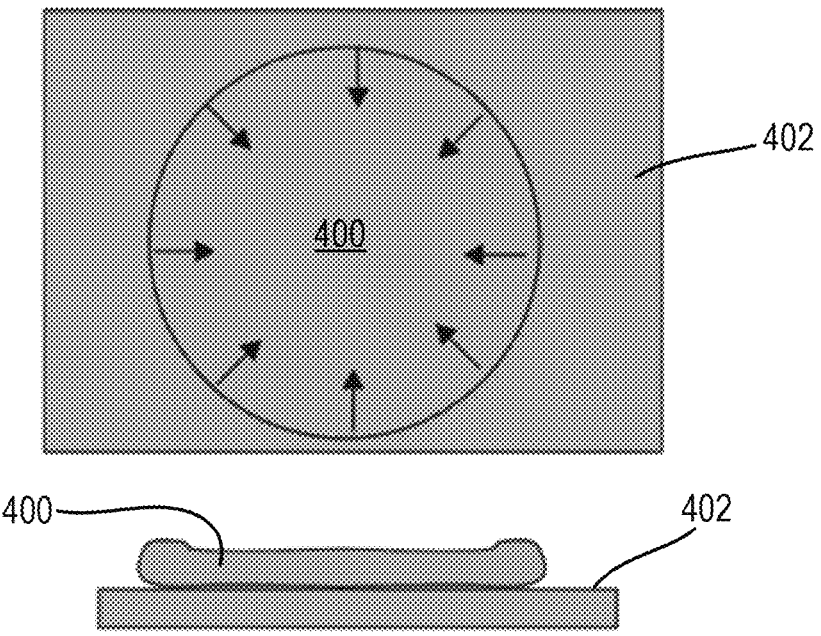
FIG. 4 includes schematic top and cross-sectional views of a droplet recoiling on a flat surface, according to an illustrative embodiment of the invention.
Figure 5:
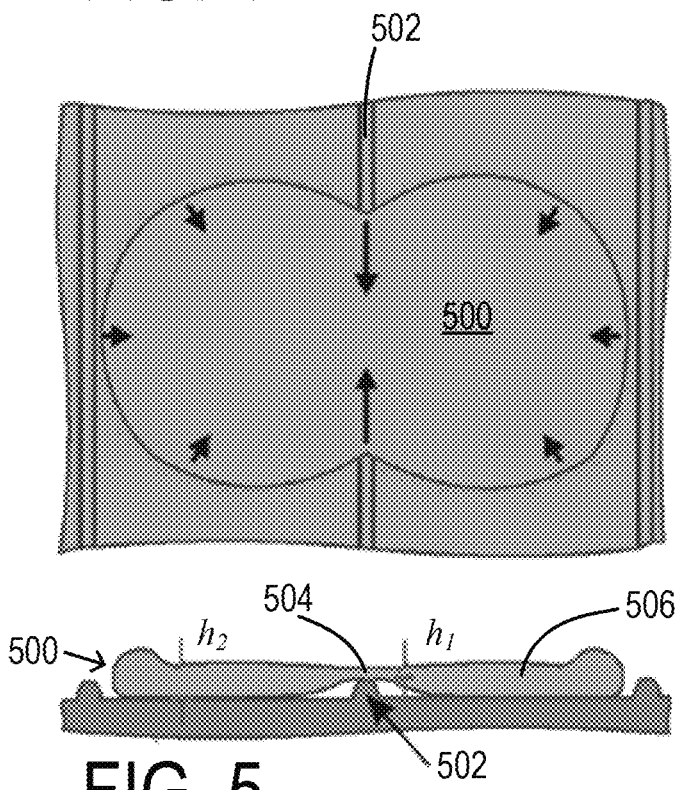
FIG. 5 includes schematic top and cross-sectional views of a droplet recoiling on a ridge, according to an illustrative embodiment of the invention.

FIGS. 4 and 5 are schematic diagrams showing a droplet 400 recoiling on a flat surface 402 and a droplet 500 recoiling on a ridge 502, respectively. As depicted, on the flat surface 402 of FIG. 4, droplet recoil is typically symmetric, with the droplet 400 remaining substantially circular over time. By comparison, on the ridge 502 of FIG. 5, droplet recoil is asymmetric, with thinner portions 504 (having thickness $h_1$) at the ridge 502 recoiling faster than thicker portions 506 (having thickness $h_2$) adjacent to the ridge 502. The thinner portions 504 may be referred to as cracks. As depicted, the ridges 502 create cracks or pathways that promote droplet fracture. These pathways cause the contact line to penetrate into the droplet 500 along the ridge 502, thereby increasing the contact line length during droplet recoil and reducing contact time.

Figure 6A:
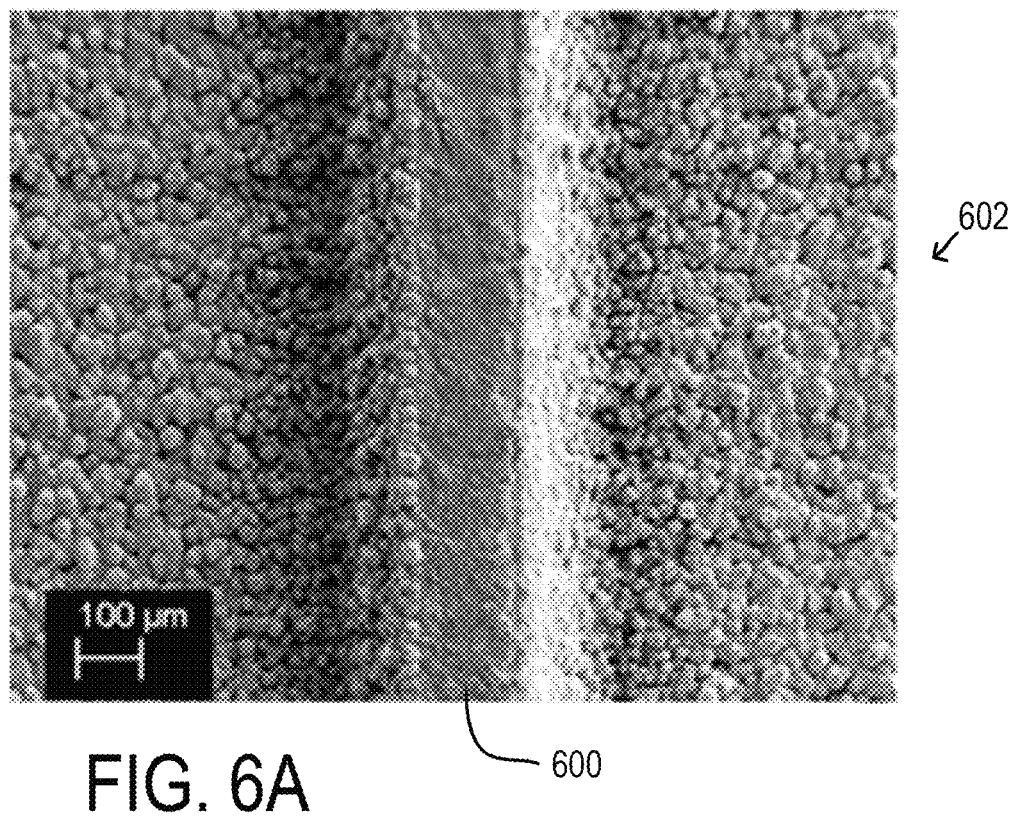
FIGS. 6a-6c include top, cross-sectional, and high-magnification scanning electron microscope (SEM) images of a macro-scale ridge (height ~150 μm, width ~200 μm) fabricated on a silicon wafer using laser-rastering, according to an illustrative embodiment of the invention.
Figure 6B:
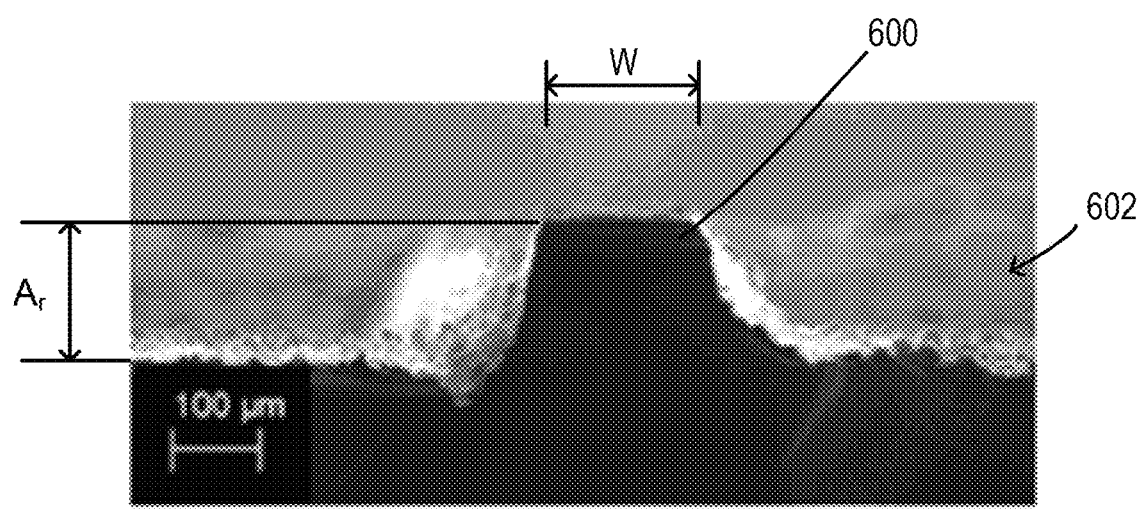
Figure 6C:
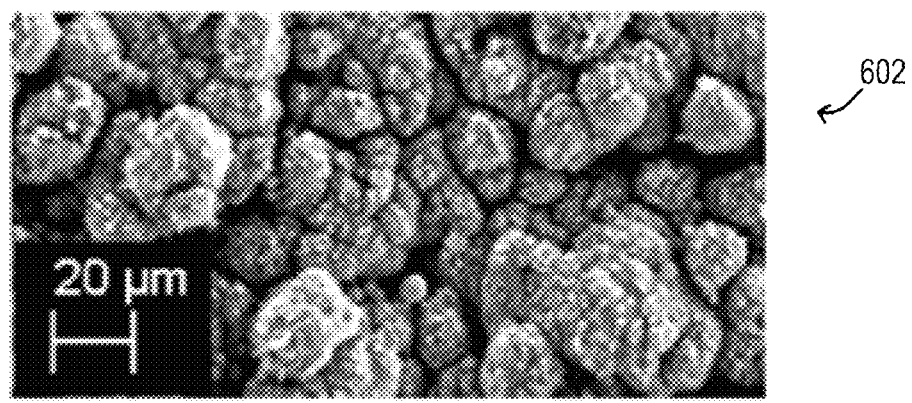
Figure 6D:
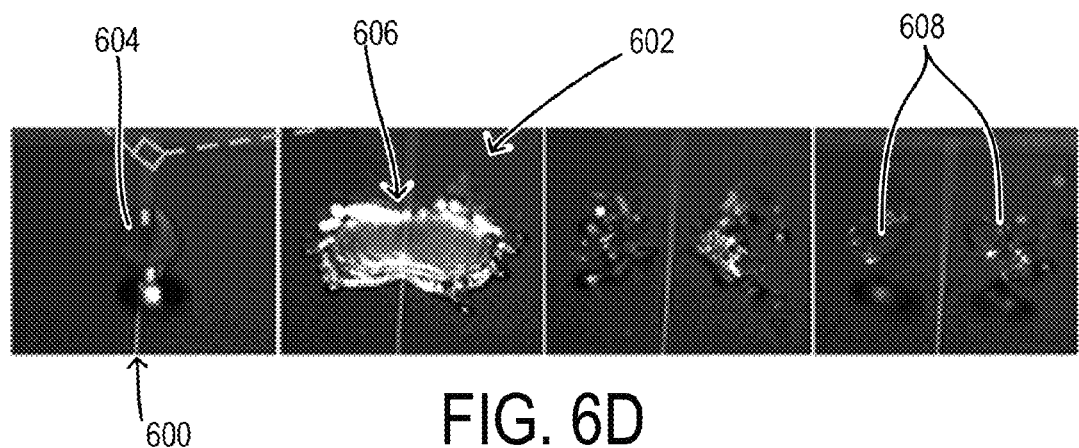
FIG. 6d includes high-speed photography images of droplet impingement on the ridge of FIGS. 6a-6c, according to an illustrative embodiment of the invention.
Figure 7A:
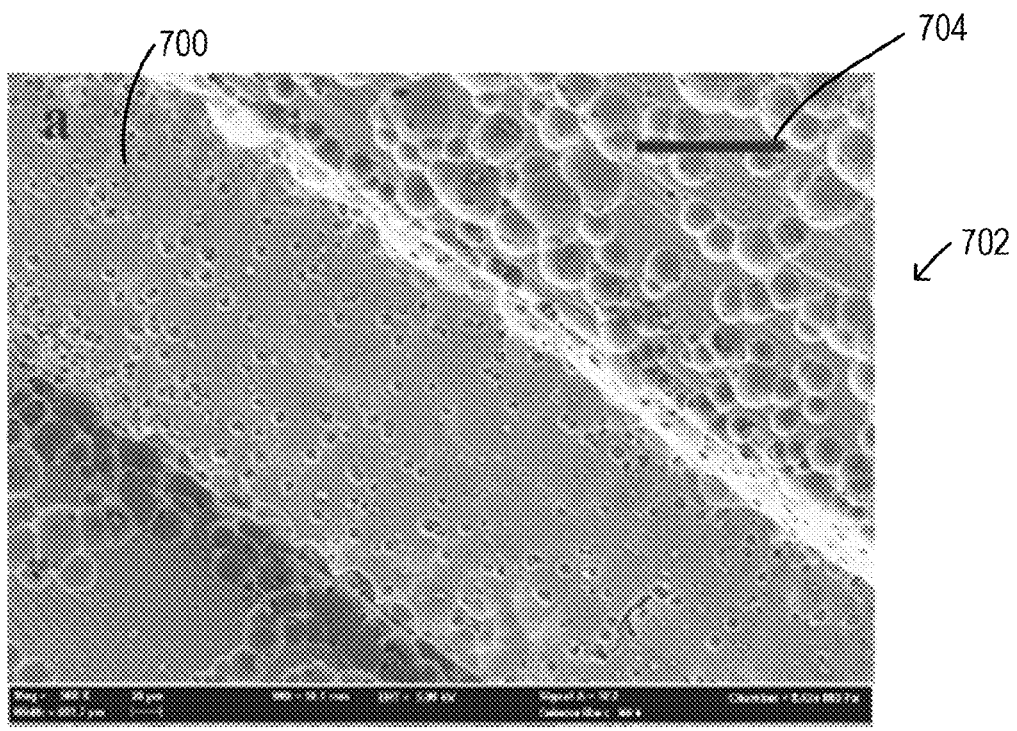
FIG. 7a is an SEM image of a macro-scale ridge (height ~100 μm, width ~200 μm) milled on an anodized aluminum oxide (AAO) surface, according to an illustrative embodiment of the invention.
Figure 7B:
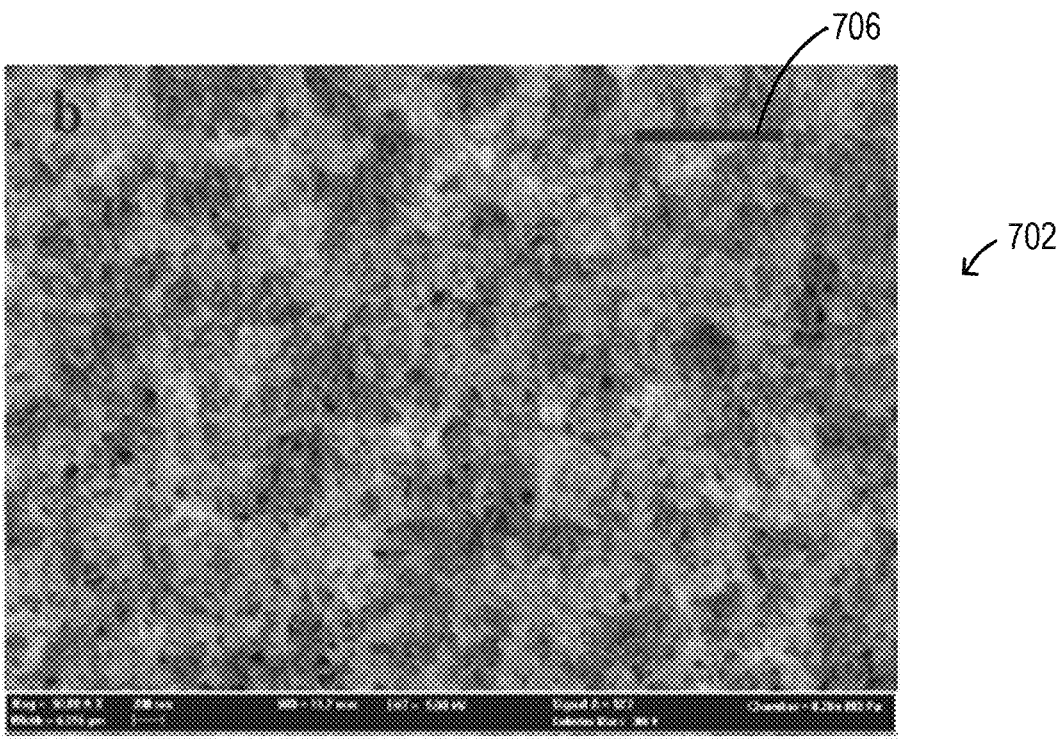
FIG. 7b is a high-magnification SEM image of the AAO surface of FIG. 7a, showing nanoscale pores, according to an illustrative embodiment of the invention.
Figure 7C:
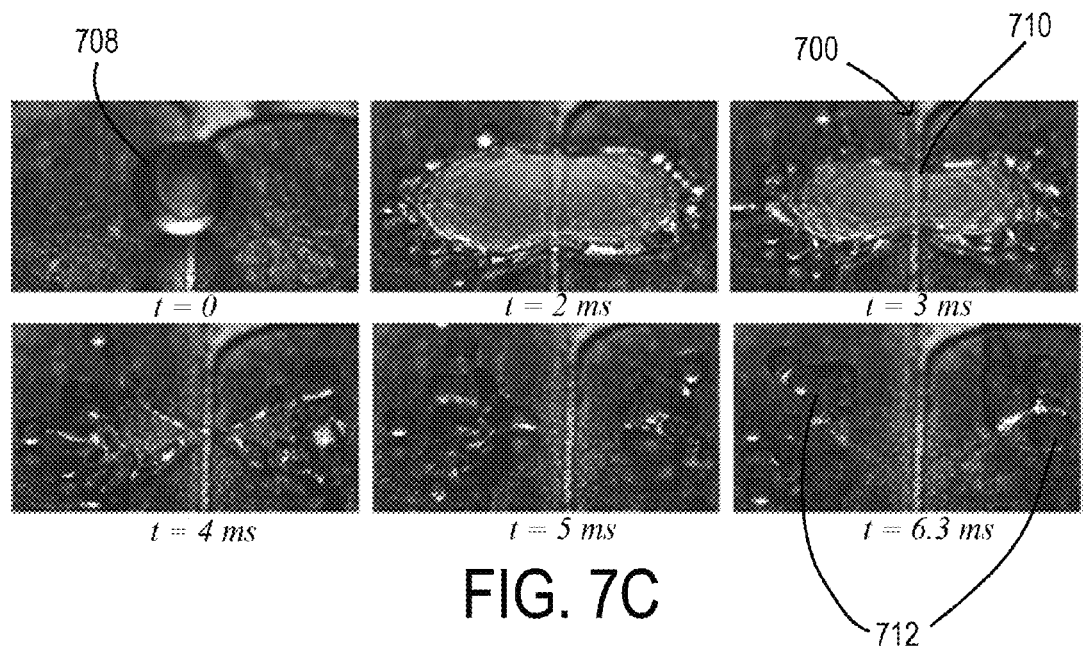
FIG. 7c includes high-speed photography images of droplet impingement on the ridge of FIG. 7a, according to an illustrative embodiment of the invention.

FIGS. 6a-6d and 7a-7c depict experimental examples of surfaces for triggering cracks in a liquid film upon droplet impingement, in accordance with certain embodiments of the invention. FIGS. 6a-6d show photographs of droplet impingement on a ridge 600 fabricated on a silicon surface 602 using laser-rastering. FIGS. 7a-7c show droplet impingement on a ridge 700, of similar dimensions, milled on an aluminum surface 702, followed by anodization to create nano-scale pores. Both surfaces 602, 702 were made superhydrophobic by depositing trichloro(1H,1H,2H,2H-perfluorooctyl)silane. The diameter of the droplet before impingement was 2.6 mm (i.e., R=1.3 mm) and the impact velocity was 1.8 m/s.

FIGS. 6a-6c show the details of the silicon surface 602 with the help of SEM images of the ridge 600, which had a ridge height $A_r$ of about 150 µm and width W of about 200 µm. These figures also show the non-wetting features achieved to maintain superhydrophobicity. The dynamics of droplet impingement are shown in FIG. 6d, which reveals that a droplet 604 deforms asymmetrically and develops a crack 606 along the ridge 600. The crack 606 creates additional recoiling fronts which propagate rapidly along the ridge 600 until the film is split into multiple drops 608. The contact time in this case was only 7 ms—almost one-third of the contact time for the example shown in FIG. 1, and about 50% less than the theoretical prediction from Equation 1 (i.e., 13.5 ms) with ϕ=0.

As mentioned above, the ridges may have any cross-sectional shape, including the approximately rectangular cross-section depicted in FIG. 6a. Additionally, a ratio of the ridge height $A_r$ to the width W (i.e., $A_r/W$) may be, for example, from about 0.1 to about 10.

FIGS. 7a-7c show similar contact time reduction achieved on the anodized aluminum oxide (AAO) surface 702. The contact time in this case was about 6.3 ms, which is over 50% smaller than the theoretical prediction of Equation 1 (i.e., 13.5 ms). The details of the surface 702 are shown in FIGS. 7a and 7b with the help of SEM images revealing the ridge texture and the nanoporous structure. The scale bars 704, 706 in FIGS. 7a and 7b are 100 µm and 1 µm, respectively. Referring to FIG. 7c, the dynamics of droplet impingement show behavior similar to that seen on the laser-rastered silicon surface. For example, a droplet 708 deforms asymmetrically with a crack 710 developing along the ridge 700, thereby causing the liquid film to recoil rapidly along the ridge 700 and split into multiple drops 712.

In certain embodiments, the reduction of contact time, as shown in the examples in FIGS. 6a-6d through 7a-7c, is more a result of surface design or structure, rather than the surface material or other surface property. For example, although the surfaces in these examples were produced by completely different methods (i.e., laser-rastering in FIG. 6a-6d, and milling and anodizing in FIGS. 7a-7c), the similar macro-scale features (e.g., ridge size and shape) of the two surfaces resulted in similar drop impingement dynamics.

Figure 8:
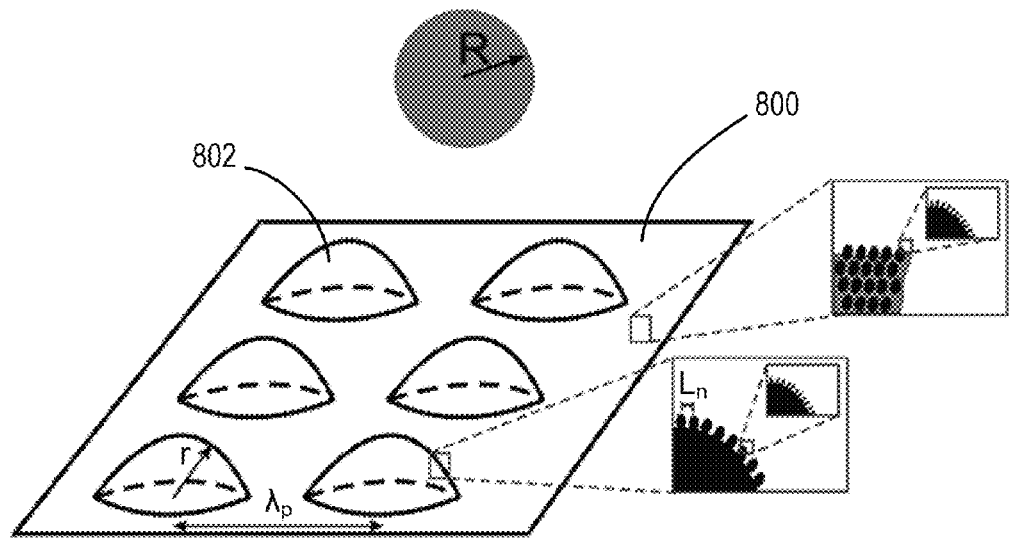
FIG. 8 is a schematic perspective view of macro-scale protrusions on a surface, according to an illustrative embodiment of the invention.

In another embodiment, a superhydrophobic surface 800 includes macro-scale protrusions 802 that nucleate holes in a liquid film upon impingement of a droplet having radius R. The protrusions 802 may have any shape, including spherical, hemispherical, dome-shaped, pyramidal, cube-shaped, and combinations thereof. For example, in the embodiment depicted in FIG. 8, the protrusions 802 are substantially dome-shaped with a protrusion height $A_p$ and are spaced in grid with a protrusion spacing $\lambda_p$. To achieve or maintain superhydrophobicity, the surface 800 includes non-wetting features having a length scale $L_n$. As mentioned above, the non-wetting features are chosen so that $\theta_d$ is greater than 90 degrees and CAH is less than about 30 degrees, less than about 20 degrees, or less than about 10 degrees.

In certain embodiments, a ratio of the protrusion height $A_p$ to the lamella or film thickness h (i.e., $A_p/h$) is greater than or equal to about 0.01. For example, $A_p/h$ may be from about 0.01 to about 100, or from about 0.1 to about 10, or from about 0.1 to about 3. In certain embodiments, a ratio of the protrusion spacing 2 to the protrusion height $A_p$ (i.e., $\lambda_p/A_p$) is greater than or equal to about 2.

Figure 9A:
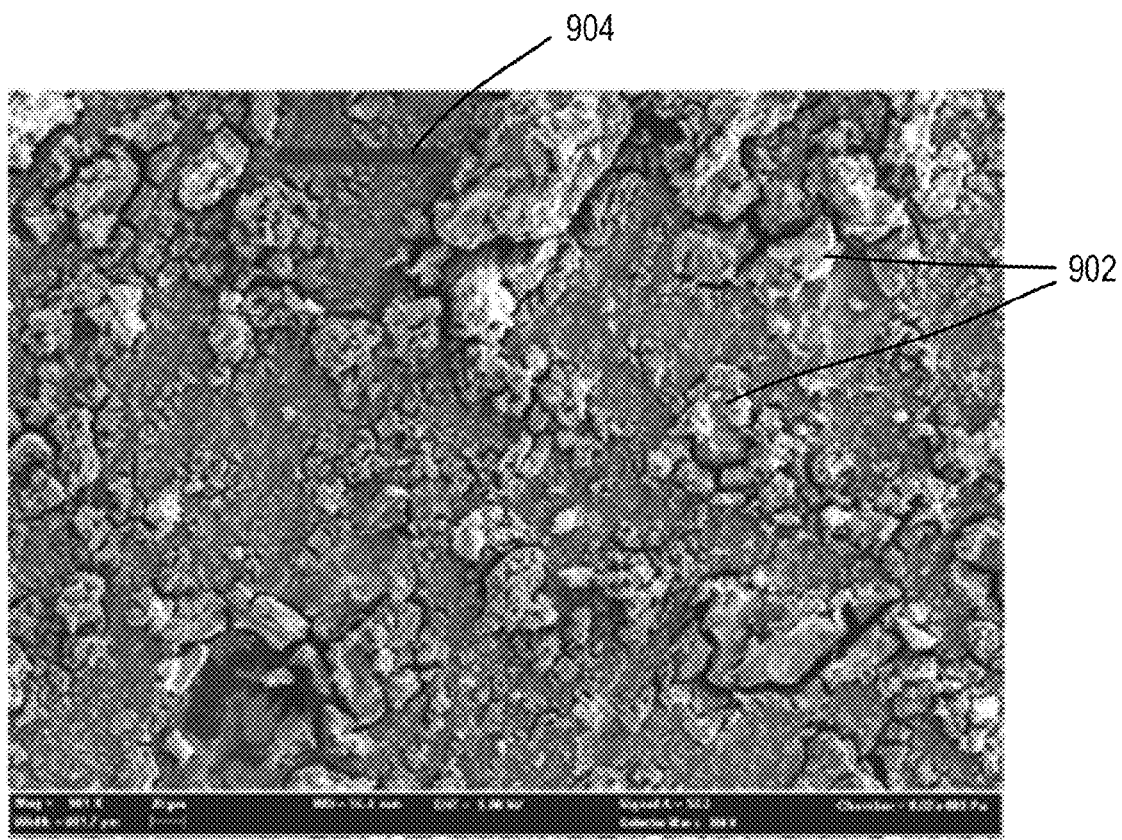
FIG. 9a is an SEM image of macro-scale protrusions (~50-100 μm) fabricated on anodized titanium oxide (ATO) surface, according to an illustrative embodiment of the invention.
Figure 9B:
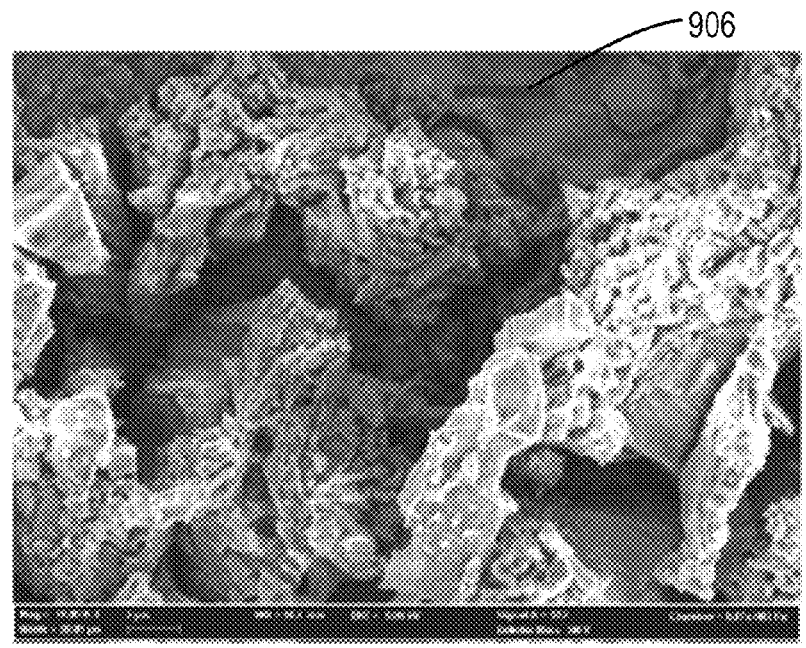
FIG. 9b is a high-magnification SEM image of the ATO surface of FIG. 9a showing nanoscale features, according to an illustrative embodiment of the invention.
Figure 9C:
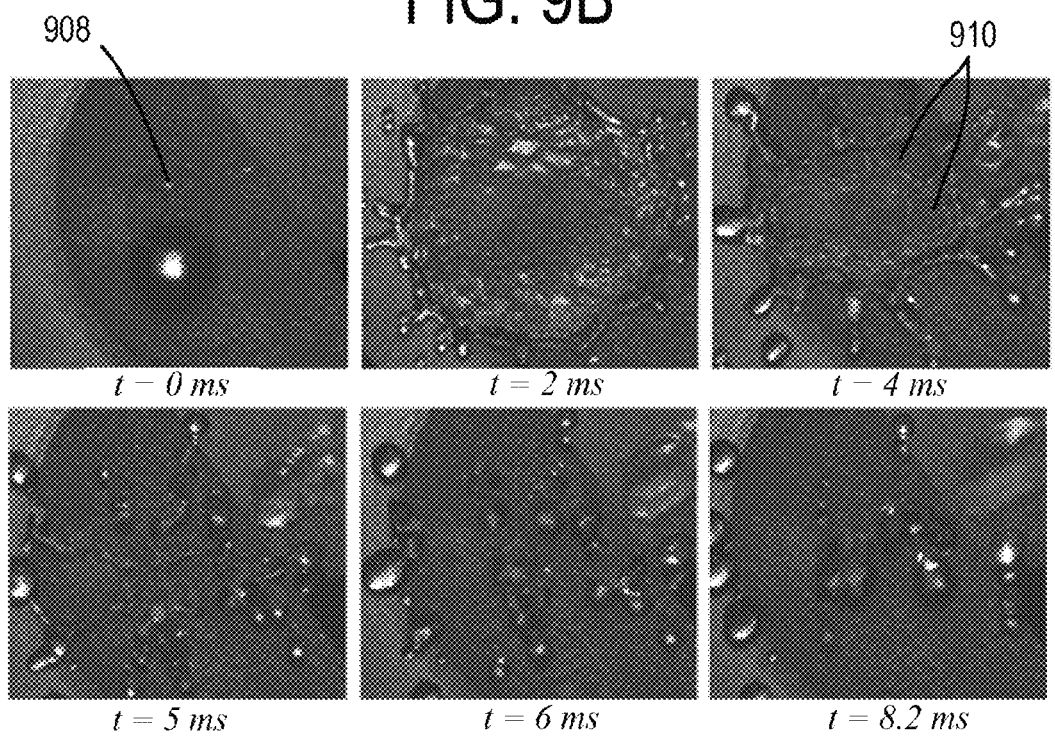
FIG. 9c includes high-speed photography images of droplet impingement on the surface of FIG. 9a, according to an illustrative embodiment of the invention.

FIGS. 9a-9c depict an example surface 900 that includes macro-scale protrusions 902 for nucleating a droplet upon impingement. The surface 900 in this example is made of anodized titanium oxide (ATO). Details of the surface 900 are shown in the SEM images. The scale bars 904, 906 in FIGS. 9a and 9b are 100 µm and 4 µm, respectively. As depicted, the surface includes macro-scale protrusions 902, of about 20-100 µm, which further contain non-wetting features to maintain superhydrophobicity. Referring to the high-speed photography images in FIG. 9c, after a droplet 908 impinges the ATO surface (at t=0), the droplet 908 spreads into a thin film (at t=2 ms) that destablizes internally and nucleates into several holes 910 (at t=4 ms). The holes 910 grow until their boundaries meet or collide, thereby causing fragmentation of the entire film. Each hole 910 creates additional fronts where the film may recoil, thus resulting in a significant reduction in contact time. The contact time in this example was about 8.2 ms, which is again much smaller than the theoretical prediction (i.e., 13.5 ms) from Equation 1 with ϕ=0.

In the depicted embodiments, the protrusions increase the contact line of the droplet by introducing holes in the droplet. The holes increase or open during recoil, thereby reducing the contact time.

Figure 10:
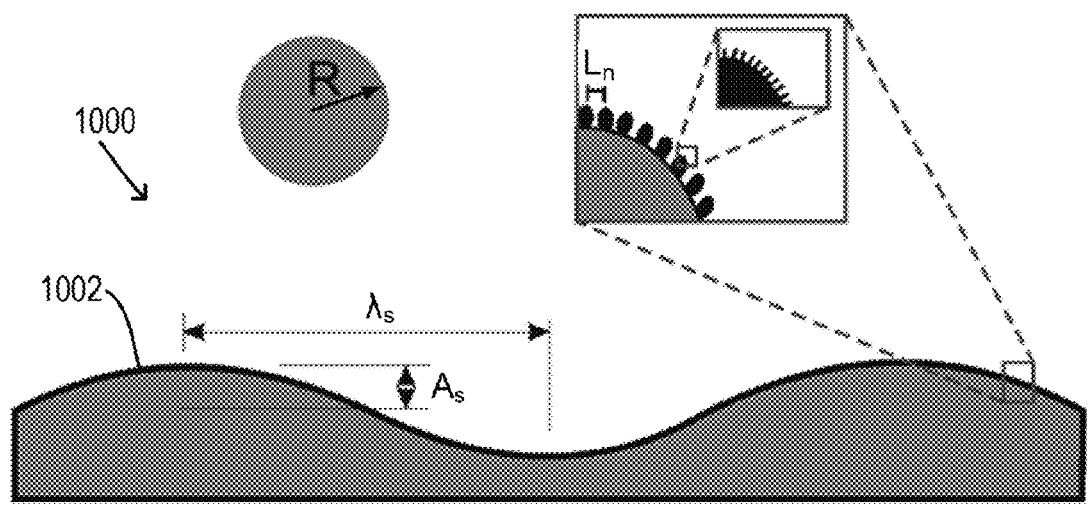
FIG. 10 includes a schematic cross-sectional view and a detailed schematic cross-sectional view of a surface having a macro-scale sinusoidal profile to trigger curvature in a receding liquid film, according to an illustrative embodiment of the invention.

In another embodiment, a superhydrophobic surface 1000 includes macro-scale curved profiles 1002 that introduce curvature in a liquid film upon impingement of a droplet having radius R. The curved profiles 1002 may have any shape, including sinusoidal and/or parabolic (e.g., piece-wise). Compared to the ridges 302 and protrusions 802, described above, the curved profiles 1002 are generally smoother, with less abrupt variations in surface height. For example, in the embodiment depicted in FIG. 10, the curved profiles 1002 define a sinusoidal pattern of peaks and valleys on the surface. The sinusoidal pattern has a wave amplitude $A_s$ and a wave spacing $\lambda_s$ (i.e., the distance from a peak to a valley). The wave spacing $\lambda_s$ may also be referred to as half the period of the sinusoidal pattern.

In certain embodiments, the surface 1000 includes curvature along more than one direction. For example, a height of surface 1000 may vary sinusoidally along one direction and sinusoidally along another, orthogonal direction.

To achieve or maintain superhydrophobicity, the surface 1000 includes non-wetting features having a length scale $L_n$. As mentioned above, the non-wetting features are chosen so that $\theta_d$ is greater than 90 degrees and CAH is less than about 30 degrees, less than about 20 degrees, or less than about 10 degrees.

In certain embodiments, a ratio of the wave amplitude $A_s$ to the thickness h (i.e., $A_s/h$) is greater than or equal to about 0.01. For example, $A_s/h$ may be from about 0.01 to about 100, or from about 0.1 to about 100, or from about 0.1 to about 50, or from about 0.1 to about 9. In certain embodiments, a ratio of the wave spacing $\lambda_s$ to the wave amplitude $A_s$ (i.e., $\lambda_s/A_s$) is greater than or equal to about 2. For example, $\lambda_s/A_s$ may be from about 2 to about 500, or from about 2 to about 100.

Figure 11A:
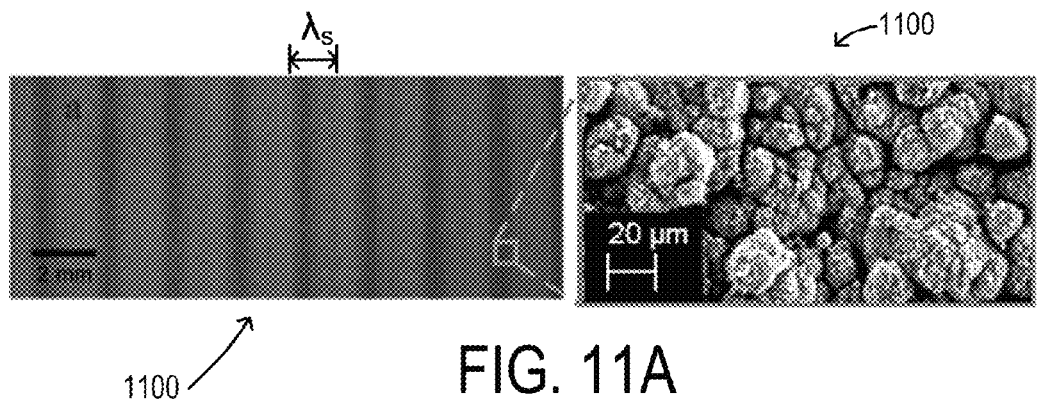
FIG. 11a includes a photograph showing a macro-scale sinusoidal surface fabricated on silicon and an image showing high magnification SEM sub-micron features, according to an illustrative embodiment of the invention.
Figure 11B:
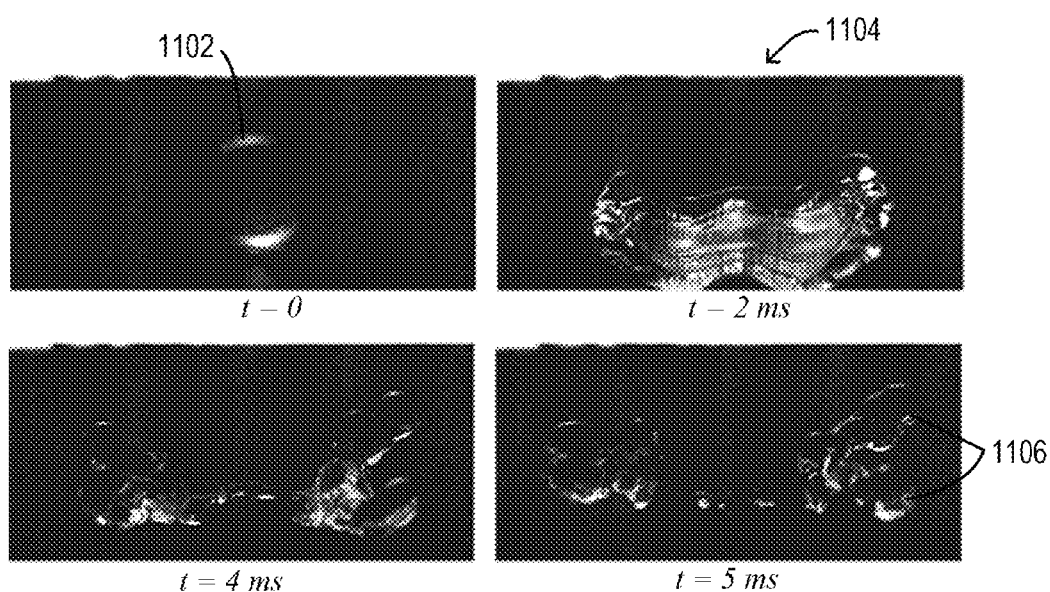
FIG. 11b includes high-speed photography images of droplet impingement on the surface of FIG. 11a, according to an illustrative embodiment of the invention.

FIG. 11a depicts an example of a sinusoidal curved surface 1100 fabricated on silicon using laser rastering. The details of the surface 1100 are shown with the help of SEM images. The wave amplitude $A_s$ of the sinusoidal pattern was about 350 µm while its period (i.e., twice the wave spacing $\lambda_s$) was 2 mm. The surface 1100 was made superhydrophobic by depositing trichloro(1H,1H,2H,2H perfluorooctyl)silane. Referring to FIG. 11b, the dynamics of droplet impingement on the surface 1100 reveal that a droplet 1102 adopts the curved profile of the surface 1100 while spreading and becomes a thin film of varying thickness. The film thickness is smallest at a crest or peak 1104 of the sinusoidal surface 1100 where the film recedes fastest, thereby causing the film to split across the crest 1104 and break into multiple drops 1106. The contact time in this example was only about 6 ms, which is again well over 50% smaller than the theoretical prediction of Equation 1 (i.e., 13.5 ms).

As described above with respect to FIGS. 10, 11a, and 11b, in certain embodiments, the contact time of the drop is reduced by controlling the local curvature of the surface. If the surface is curved so that part of the film covers a concave region, one of two scenarios may occur—both of which decrease the total contact time of the film on the surface. In one scenario, the film spreads over the concavity so that the thickness is nearly uniform. If the film is making contact with the curved surface, then the film is also curved, in which case the film curvature, along with surface tension, causes a pressure gradient that lifts the film off of the surface as quickly as the edges recoil. In the other scenario, the film spreads over the concavity in a way that the film surface is flat (i.e., not curved). In this case the film thickness is not uniform and, along contours where the film is thinner, the drop recoils more quickly than along areas where the film is thicker. As discussed above, by forming a hybrid surface of linked concave cusps, the contact time may be reduced below the theoretical limit defined by Equation 1.

Figure 12A:
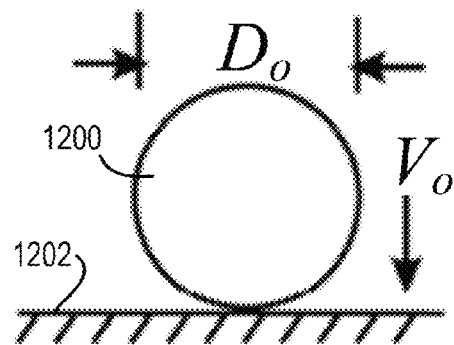
FIG. 12a is a schematic view of droplet impingement on a solid surface at the instant of impact, according to an illustrative embodiment of the invention.
Figure 12B:
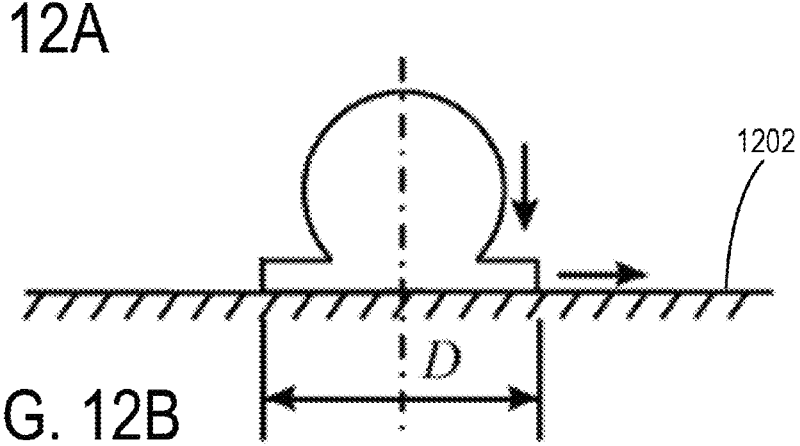
FIG. 12b is a schematic view of droplet impingement on a solid surface during spreading, according to an illustrative embodiment of the invention.
Figure 12C:
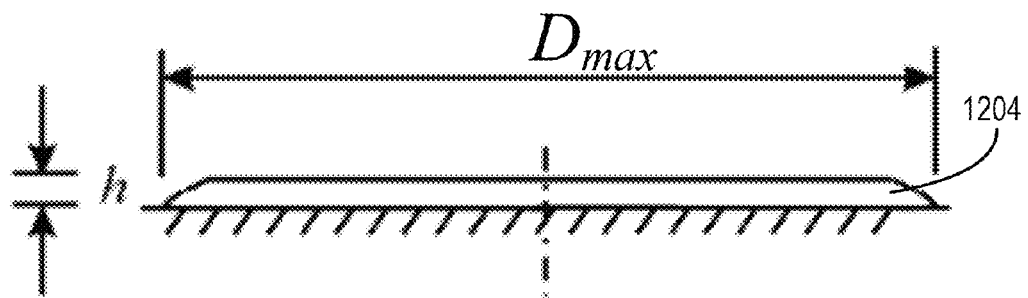
FIG. 12c is a schematic view of droplet impingement on a solid surface at the instant when spreading comes to a rest, according to an illustrative embodiment of the invention.

When a liquid droplet 1200 of diameter $D_o$ impinges a solid surface 1202 with velocity $V_o$, the droplet 1200 spreads into a thin lamella (film) 1204 of thickness h, eventually reaching a maximum diameter $D_{max}$, as shown in FIGS. 12a, 12b, and 12c. h can be estimated by applying mass conservation at the spherical droplet state, shown in FIG. 12a, and the lamella state, shown in FIG. 12c, with the assumptions that there is negligible mass loss (e.g., due to splashing or evaporation) during spreading and the lamella 1204 is substantially uniform in thickness in time and space, on average. With these assumptions, the mass of the droplet 1200 when equated at the spherical droplet state and the lamella state yields:

$$\rho \frac{\pi}{6} D_o^3 = \rho \frac{\pi}{4} D_{max}^2 h, \tag{3}$$

where $\rho$ is the density of droplet liquid. Solving Equation 3 for h gives:

$$h = \frac{2D_o}{3\xi_{max}^2}, \tag{4}$$

where $\xi_{max} = D_{max}/D_o$ is the maximum spread factor of the impinging droplet. To calculate $\xi_{max}$, an energy balance model may be used. According to this model, $\xi_{max}$ is given as:

$$\xi_{max} = \sqrt{\frac{We + 12}{3(1 - \cos\theta_a) + 4(We/\sqrt{Re})}}, \tag{5}$$

where $\theta_a$ is the advancing contact angle formed by a droplet of liquid on the solid surface 1202, $We = \rho V_o^2 D_o / \gamma$ is the droplet Weber number, and $Re = \rho V_o D_o / \mu$ is the droplet Reynolds number before impingement. Here $\gamma$ and $\mu$ are the surface tension and dynamic viscosity of the droplet liquid, respectively. Equation 5 can be simplified further by approximating the value of expression $3(1-\cos\theta_a)$ to 6 as $\theta_a$, at maximum, can be 180°. With this simplification, Equation 5 becomes:

$$\xi_{max} = \sqrt{\frac{We + 12}{6 + 4(We/\sqrt{Re})}}, \tag{6}$$

Thus, once $\xi_{max}$ is calculated from Equation 6, h can be estimated using Equation 4.

The devices and methods described herein have a wide range of applications, including rainproof products, wind turbines, steam turbine blades, aircraft wings, and gas turbine blades. Table 1 presents typical droplet radius values for several of these applications. As indicated, for rainproof products and wind turbine applications, droplet radius values may be from about 0.1 mm to about 5 mm. Similarly, for steam turbine blades, aircraft icing, and gas turbine blade applications, droplet radius values may be from about 0.01 mm to about 5 mm. In one embodiment, for rainproof products and wind turbine applications, lamella thickness values are from about 0.01 mm to about 1 mm, and $\xi_{max}$ values are from about 5 to about 100. In another embodiment, for steam turbine blades, aircraft icing, and gas turbine blade applications, lamella thickness values are from about 0.001 mm to about 1 mm, and $\xi_{max}$ values are from about 10 to about 500.

In certain embodiments, Table 1 is used to identify appropriate dimensions for the features described above (i.e., ridges, protrusions, and curved profiles) for reducing the contact time between an impinging droplet and a surface. For example, referring to Table 1, if the intended application is rainproof products and the feature type is ridges, then appropriate feature dimensions (in mm) are $0.0001 < A_r$ and $\lambda_r \geq 0.0001$. Likewise, if the intended application is gas turbine blades and the feature type is protrusions, then appropriate feature dimensions (in mm) are $0.00001 < A_p$ and $\lambda_p \geq 0.00002$.

As indicated in Table 1, $A_r$, $A_p$, or $A_c$ may be greater than 0.00001 mm, and $\lambda_r$, $\lambda_p$, or $\lambda_c$ may be greater than or equal to about 0.00001 mm. In certain embodiments, $A_r$, $A_p$, or $A_c$ is greater than about 0.0001 mm, greater than about 0.001 mm, greater than about 0.01 mm, greater than about 0.1 mm, or greater than about 1 mm. In certain embodiments, $A_r$, $A_p$, or $A_c$ is from about 0.00001 mm to about 0.001 mm, from about 0.0001 mm to about 0.01 mm, from about 0.001 mm to about 0.1 mm, or from about 0.01 mm to about 1 mm. In certain embodiments, $\lambda_r$, $\lambda_p$, or $\lambda_c$ is greater than about 0.0001 mm, greater than about 0.001 mm, greater than about 0.01 mm, greater than about 0.1 mm, or greater than about 1 mm. In certain embodiments, $\lambda_r$, $\lambda_p$, or $\lambda_c$ is from about 0.00001 mm to about 0.001 mm, from about 0.0001 mm to about 0.01 mm, from about 0.001 mm to about 0.1 mm, or from about 0.01 mm to about 1 mm.

TABLE 1

Ranges for droplet radius and macro-scale feature dimensions.

| Application | Droplet Radius, R (mm) | Impact Velocity, V (m/s) | Lamella Thickness, h (mm) | Feature Type | Feature Dimensions* (mm) |
|---|---|---|---|---|---|
| Rainproof products & wind turbine | 0.1-5 | 0.5-20 | 0.01-1 | Type (i): ridges | $0.0001 < A_r$, $\lambda_r \geq 0.0001$ |
| | | | | Type (ii): protrusions | $0.0001 < A_p$, $\lambda_p \geq 0.0002$ |
| | | | | Type (iii): curvature | $0.0001 < A_c$, $0.0002 \leq \lambda_c$ |
| Steam turbine blades, Aircraft icing, Gas turbine blades | 0.01-5 | 0.5-200 | 0.001-1 | Type (i): ridges | $0.00001 < A_r$, $\lambda_r > 0.00001$ |
| | | | | Type (ii): protrusions | $0.00001 < A_p$, $\lambda_p \geq 0.00002$ |
| | | | | Type (iii): curvature | $0.00001 < A_c$, $0.00002 \leq \lambda_c$ |

In alternative embodiments, the devices and methods described herein apply to droplets of oil-based liquids impinging on an oleophobic surface or a superoleophobic surface. In this case, the macro-scale features, such as ridges, protrusions, and sinusoidal patterns, may produce oil droplet impingement dynamics that are similar to those shown and described for water droplets impinging a hydrophobic or superhydrophobic surface.

In certain embodiments, when a water droplet impinges a surface that is hot enough to vaporize the liquid quickly and generate sufficient pressure, the droplet can spread and rebound without ever touching the surface, mimicking a situation seen in superhydrophobic surfaces. This so-called Leidenfrost phenomenon is an example of a non-wetting situation without the surface being superhydrophobic. In one embodiment, the macro-scale features applied to this type of surface are effective in reducing the contact time of an impinging droplet. Specifically, the droplet dynamics are similar to those described above for the superhydrophobic surfaces, and the contact time reduction is of similar magnitude (~50% of the theoretical limit). In one embodiment, to achieve the desired non-wetting behavior, the surface is heated to a temperature greater than the Leidenfrost temperature.

Blades of steam and gas turbines are sometimes fouled by metallic fragments that are produced due to erosion/corrosion of intermediary equipment in the power cycle. These fragments are carried along with the working fluid (steam or combustion gases, as the case may be) and melt when they reach regions of high temperatures. The melted liquid impinges upon turbine blades and gets stuck thereby deteriorating aerodynamical performance and hence turbine power output. Our surface designs can solve this problem by rapidly repelling the impinging molten liquid before it can freeze on blade surfaces.

Experimental Examples

As described herein, a series of experiments were conducted to measure and visualize the impingement of droplets on surfaces having macro-scale features. A high speed camera system (Model SA 1.1, PHOTRON USA, San Diego, Calif.) was utilized to capture a sequence of images of the droplet impingement. Droplets of controlled volume (10 µL) were dispensed using a syringe pump (HARVARD APPARATUS, Holliston, Mass.) using a 26 gauge stainless steel needle. Droplet impact velocity was controlled by setting the needle at a certain height (150 mm) above the surface. Contact times were determined from the images by identifying the time difference between the point of initial droplet contact with the surface and the subsequent rebound of liquid from the surface.

Images of macro-scale ridges and droplets impinging on the ridges are provided in FIGS. 6a-6d and 7a-7c, in accordance with certain embodiments of the invention. FIGS. 6a-6d show photographs of droplet impingement on a ridge 600 fabricated on a silicon surface 602 using laser-rastering. FIGS. 7a-7c show droplet impingement on a ridge 700, of similar dimensions, milled on an aluminum surface 702, followed by anodization to create nano-scale pores. Both surfaces 602, 702 were made superhydrophobic by depositing trichloro(1H,1H,2H,2H-perfluorooctyl)silane. The diameter of the droplet before impingement was 2.6 mm (i.e., R=1.3 mm) and the impact velocity was 1.8 m/s. As discussed in detail above, the contact times achieved with the macro-scale ridges were about 50% less than the theoretical prediction from Equation 1 (i.e., 13.5 ms) with $\phi=0$.

Images of macro-scale protrusions and droplets impinging on the protrusions are provided in FIGS. 9a-9c, in accordance with certain embodiments of the invention. The surface 900 in this example is made of anodized titanium oxide (ATO). Details of the surface 900 are shown in the SEM images. The scale bars 904, 906 in FIGS. 9a and 9b are 100 µm and 4 µm, respectively. As depicted, the surface includes macro-scale protrusions 902, of about 20-100 µm, which further contain non-wetting features to maintain superhydrophobicity. As discussed in detail above, the contact times achieved with the macro-scale protrusions was about half of the theoretical prediction (i.e., 13.5 ms) from Equation 1 with $\phi=0$.

Images of macro-scale curvature and droplets impinging on the curvature are provided in FIGS. 11a and 11b, in accordance with certain embodiments of the present invention. As discussed above, the sinusoidal curved surface 1100 was fabricated on silicon using laser rastering. The details of the surface 1100 are shown with the help of SEM images. The wave amplitude $A_c$ of the sinusoidal pattern was about 350 µm while its period (i.e., twice the wave spacing $\lambda_c$) was 2 mm. The surface 1100 was made superhydrophobic by depositing trichloro(1H,1H,2H,2Hperfluorooctyl)silane. The contact time in this example was only about 6 ms, which is again well over 50% smaller than the theoretical prediction of Equation 1 (i.e., 13.5 ms).

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An atomizer comprising a non-wetting surface having a dynamic contact angle with a liquid of at least about 90°, said surface comprising non-wetting features, said surface patterned with macro-scale features having a length scale $L_m$ that is larger than a length scale $L_n$ of the non-wetting features, the macro-scale features being configured to induce controlled asymmetry in a liquid film produced by impingement of a droplet onto the surface, thereby reducing contact time $t_c$ between the droplet and the surface to a value lower than $$2.2\left(\frac{\rho R^3}{\gamma}\right)^{1/2}\left(1+\frac{\phi}{4}\right),$$

where the droplet has a radius R, density $\rho$, surface tension $\gamma$, and the patterned surface having a pinning fraction $\phi$ of zero.

2. The atomizer of claim 1, wherein the non-wetting surface is supermetallophobic.

3. The atomizer of claim 1, wherein the droplet comprises a molten metal.

4. The atomizer of claim 1, wherein $L_m/L_n$ is 10 or greater.

5. The atomizer of claim 1, wherein $L_m/L_n$ is 100 or greater.

6. The atomizer of claim 1, wherein $L_m/L_n$ is 1000 or greater.

7. The atomizer of claim 1, wherein $L_m/L_n$ is 10,000 or greater.

8. The atomizer of claim 1, wherein the non-wetting surface is superhydrophobic.

9. The atomizer of claim 1, wherein the non-wetting features having the length scale $L_n$ comprise non-wetting features having a second scale disposed thereon, wherein the second scale is smaller than $L_n$.

10. The atomizer of claim 9, wherein $L_m/L_n$ is greater than 10.

11. The atomizer of claim 9, wherein $L_m/L_n$ is greater than 100.

12. The atomizer of claim 1, wherein the macro-scale features comprise non-wetting features thereon.

13. The atomizer of claim 12, wherein the non-wetting features comprise non-wetting features having a second scale disposed thereon, wherein the second scale is smaller than $L_n$.

14. The atomizer of claim 1, wherein the contact time $t_c$ is more than 50% below $$2.2\left(\frac{\rho R^3}{\gamma}\right)^{1/2}\left(1+\frac{\phi}{4}\right).$$

15. The atomizer of claim 1, wherein the non-wetting features comprise random or patterned surface roughness.

* * * * *